(12) United States Patent
Marks

(10) Patent No.: US 6,876,977 B1
(45) Date of Patent: Apr. 5, 2005

(54) SHARED SHOPPING BASKET MANAGEMENT SYSTEM

(75) Inventor: Michael A. Marks, Dedham, MA (US)

(73) Assignee: The Foxboro Company, Foxboro, MA (US)

( * ) Notice: Subject to any disclaimer, the term of this patent is extended or adjusted under 35 U.S.C. 154(b) by 766 days.

(21) Appl. No.: 09/627,017

(22) Filed: Jul. 27, 2000

Related U.S. Application Data

(60) Provisional application No. 60/185,806, filed on Feb. 29, 2000, provisional application No. 60/183,138, filed on Feb. 17, 2000, provisional application No. 60/168,271, filed on Dec. 1, 1999, provisional application No. 60/163,528, filed on Nov. 4, 1999, and provisional application No. 60/145,825, filed on Jul. 27, 1999.

(51) Int. Cl.[7] .............................................. G06F 17/60

(52) U.S. Cl. .......................................... 705/26; 705/27

(58) Field of Search ................ 705/26–27; G06F 17/60

(56) References Cited

U.S. PATENT DOCUMENTS

| | | | | |
|---|---|---|---|---|
| 5,710,887 A | * | 1/1998 | Chelliah et al. | 705/26 |
| 5,715,314 A | * | 2/1998 | Payne et al. | 705/26 |
| 5,727,163 A | * | 3/1998 | Bezos | 705/27 |
| 5,826,242 A | * | 10/1998 | Montulli | 705/26 |
| 5,870,717 A | * | 2/1999 | Wiecha | 705/26 |
| 5,909,492 A | * | 6/1999 | Payne et al. | 705/26 |
| 5,963,916 A | * | 10/1999 | Kaplan | 705/26 |
| 5,966,697 A | * | 10/1999 | Fergerson et al. | 705/26 |
| 5,970,472 A | * | 10/1999 | Allsop et al. | 705/26 |
| 6,101,484 A | * | 8/2000 | Halbert et al. | 705/26 |
| 6,266,649 B1 | * | 7/2001 | Linden et al. | 705/26 |
| 6,317,722 B1 | * | 11/2001 | Jacobi et al. | 705/27 |
| 6,449,599 B1 | * | 9/2002 | Payne et al. | 705/27 |

FOREIGN PATENT DOCUMENTS

| | | | | |
|---|---|---|---|---|
| EP | 1170690 | * | 1/2002 | G06F/17/60 |
| JP | 20010300193 | * | 9/2001 | G06F/17/60 |
| WO | WO0101313 | * | 1/2001 | G06F/17/60 |
| WO | WO0133453 | * | 5/2001 | G06F/17/60 |

OTHER PUBLICATIONS

Amazon.com, Amazon.com books (online orders using shopping carts, selecting payment method, and checking status .etc., 1996–2001 (from http://www.amazon.com/).*

Jeremy Carl, Bookseller's online ambitions—Amazon.com knows competitors can't be far behind, WebWeek, v1 n6 p17, 20, Oct. 1, 1995.*

Michelle V. Rafter, Website that work: shop til' you drop, Online Access, May 1, 1996, v11 n5 p43 (from Dialog Classic Web file 233).*

(Continued)

*Primary Examiner*—Cuong Nguyen
(74) *Attorney, Agent, or Firm*—Sampson & Assoc.; David Barron

(57) ABSTRACT

A computer implemented method is provided for conducting business-to-business electronic commerce over the Internet. The method includes the step of providing a website that enables electronic communication with users, and including on the website an electronic shopping basket which is selectively actuatable into various states. An additional step includes enabling two or more remote users to simultaneously access the shopping basket. Each of the users is assigned one or more hierarchically distinct abilities to affect the state of the shopping basket, so that the users are permitted to simultaneously view the status of the shopping basket and sequentially affect the state of the shopping basket. This enables various actions in the purchasing process to be accomplished by various individuals. These abilities to affect the state of the basket may also include providing the users with various selected levels of access to the basket, i.e., to prevent unauthorized purchases. Notification of any change of the state of the shopping basket is automatically sent to all of the users by affecting a display of the shopping basket on the website.

65 Claims, 18 Drawing Sheets

OTHER PUBLICATIONS

Julia Angwin, Cashing in on the net—unique offerings will draw customers, San Francisco Chronicle (SF), Jul. 18, 1996 (from Dialog Classic Web, file 640).*

Eric Hall, Viaweb Store 4.0 makes I–commerce setup simple, InfoWorld, /Feb. 1998, v20 n5 p47(1), (from Dialog(R) File 256, acc. No. 00105360).*

From Dialog(R) File 20, Waiter.com partners with Pizz'a Chicago to give web users taste of the windy city, PR Newswire, Dec. 20, 1999.*

From Dialog(R) File 20, iastore.com introduces 'TeamBuy' shared shopping basket feature, Business Wire, May 17, 2000.*

Les Kane et al., Purchasing site offers shared shopping basket, Hydrocarbon Processing, Aug. 2000, v79 n8, p29.*

Dickinson C. Waters, Online ordering, delivery going smooth so far for Jamba Juice, Nation's Restaurant News, Oct. 30, 2000, v34n44, pp. 22.*

Ann M. Mack, Fashion Flash, Brandweek, Oct. 9, 2000, v41 n39, pp. 52–54 (From Dialog(R) File 15, acc No. 02089989).*

Rafter, Michelle V. "Websites that Work: Shop Til' You drop", Online Access, May 1, 1996, v11 n5 p43.

Angwin, Julia "Cashing In On The Net —Unique Offerings Will Draw Customers", San Francisco Chronicle (SF), Jul. 18, 1996.

Amazon.com, Amazon.com Books Downloaded from http://www.amazon.com/.

Carl, Jeremy, "Bookseller's Online Ambitions—Amazon.com Knows Competitiors Can't Be Far Behind", Web Week, v1 n6 p17–20, Oct. 1995.

Messmer, Ellen. "Start –up preps e–comm suite: Fire piece of suite targets procurement." Network World May 25, 1998: p. 14 (2 pages).

Flether–MacDonald, Trina. "Web–based procurement: The buying connection; If it hasn't happened yet it will." Infoworld Jul. 19, 1999: p. 54 (40 pages).

http://www.works.com; selected pages (Downloaded on Jun. 22, 2000) (https://works.com/membership/company/co_add_user.jsp) (https://works.com/membership/company/co_default.jsp) (https://www.works.com//membership/pdefault.jsp) (https://works.com/membership/company/co_custom_purchase_policy.jsp).

http://www.shartiarts.com/Services/oystore/enablemarkets/enablemarkets.html (downloaded on Jul. 18, 2000).

http://www.cs.umn.edu/Research/GroupLens/.

* cited by examiner

SHOPPING GROUP ATTRIBUTES

- 88 — NAME OF GROUP
- 90 — MEMBERS IN GROUP
- 91 — AUTHORIZATION PATH OF SHOPPING EXPERIENCE (HIERARCHY)

*FIG. 4*

REGISTRANT ATTRIBUTES

- 80 — ADDRESSES AND OTHER INFO
- 82 — E-COMMERCE/BASKET MANAGEMENT FUNCTIONS
  - SPECIFY BASKET CONTENTS = CREATE LINE ITEMS
  - REVIEW BASKET CONTENTS = READ-ONLY
  - EDIT BASKET CONTENTS = ADD, DELETE, MODIFY BY ITEM
  - ARCHIVE BASKET = STORE FOR LATER RETRIEVAL
  - RETRIEVE BASKET = REACTIVATE AFTER ARCHIVE
  - DELETE BASKET = ERASE ENTIRE BASKET AFTER CONFIRMATION
  - CATALOG BASKET CONTENTS = KEEP AS LOCAL SHOPPING LIST
  - AUTHORIZE BASKET CONTENTS = APPROVE FOR NEXT STEP
  - INQUIRE ABOUT BASKET CONTENTS (BY LINE ITEM/S OR ALL)
  - DENY BASKET CONTENTS (BY LINE ITEM/S OR ALL)
  - RESUBMIT BASKET AFTER INQUIRY OR DENY
  - RELEASE BASKET AFTER INQUIRY
  - ISSUE = .O. = AFFIX PURCHASE ORDER NUMBER TO BASKET
  - AUTHORIZE PURCHASE = PLACE ORDER ON IA STORE
  - CLOSE-OUT BASKET = ARCHIVE BASKET AFTER RECEIPT OF GOODS
  - PAY INVOICE = AUTHORIZE A/P TO PAY INVOICE FOR ORDER
  - SUPERUSER = ALL OF THE ABOVE
- 84 — RELATIONSHIPS
  - EMPLOYEE OF CUSTOMER
  - EMPLOYEE OF ORDER ENTRY COMPANY (OEC)
  - EMPLOYEE OF AGENT OF CUSTOMER
  - EMPLOYEE OF AGENT OF OEC
- 86 — SHOPPING GROUP MEMBERSHIP

*FIG. 3*

EXAMPLE ACCOUNT MANAGER'S PERSONAL PORTAL

SYSTEM 20 HEADER, ARTWORK AND NAVBAR
(PROFILE REPLACED BY PORTAL AFTER LOGIN)

WELCOME <USER NAME> TO YOUR
SYSTEM 20 PERSONAL PORTAL

CLICK ON UNDERLINED ITEM TO VIEW DETAILS

144 — PERSONAL PROFILE AND PASSWORD
146 — ACCOUNT MANAGEMENT
142 — FORWARDED BASKET AND ACTIVITY LOG
140 — SHARED BASKETS AND GROUPS $130_1$

SYSTEM 20 HEADER/FOOTER, ARTWORK AND NAVBAR

<USER NAME> PERSONAL PORTAL
ACCOUNT MANAGEMENT

154

156
CLICK ON UNDERLINED ITEM          CLICK ON UNDERLINED ITEM
TO PERFORM FUNCTION               TO PERFORM FUNCTION

OBTAIN SUMMARIES OF:              MAIL CENTER:
• CUSTOMER ORDERS                   • INDIVIDUAL
  -INDIVIDUALS                      • GROUP
  -PLANT                            • PLANT
  -ACCOUNT                          • ACCOUNT
• BASKETS                         REVIEW CONTRACTS
  -CREATED                        IN EFFECT:
  -PENDING                  152 — NPA FOR ACCOUNT
  -ORDERED                  162 — REVIEW CUSTOMER
• REGISTRATIONS                   FEEDBACK MESSAGES
  -INDIVIDUALS
  -ACCOUNTS

*FIG. 14*

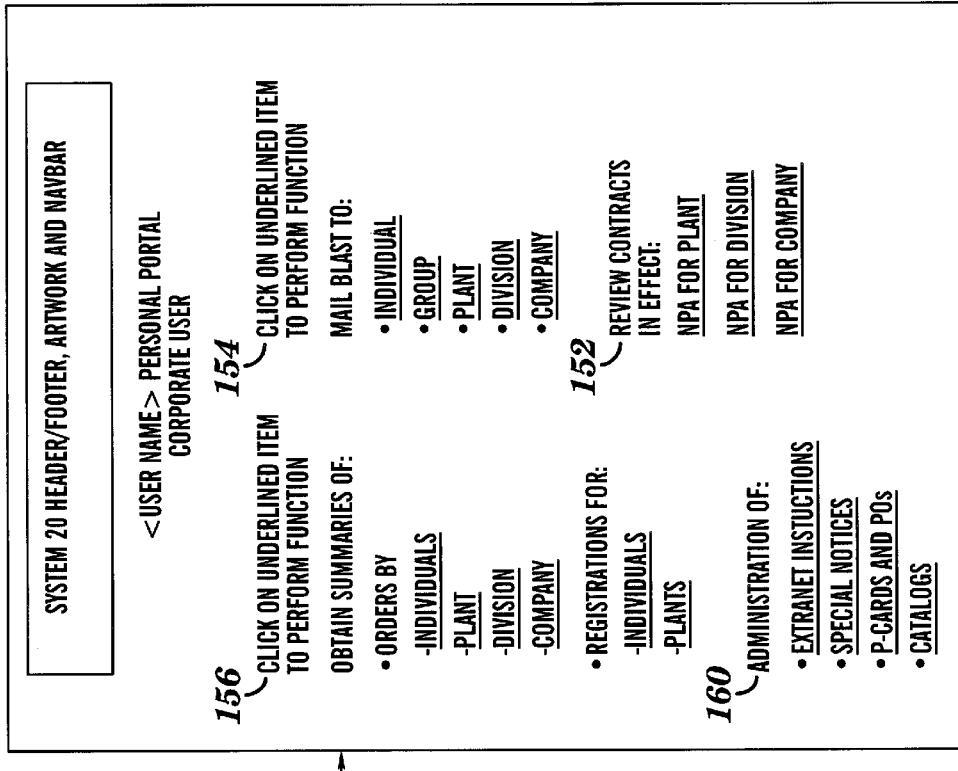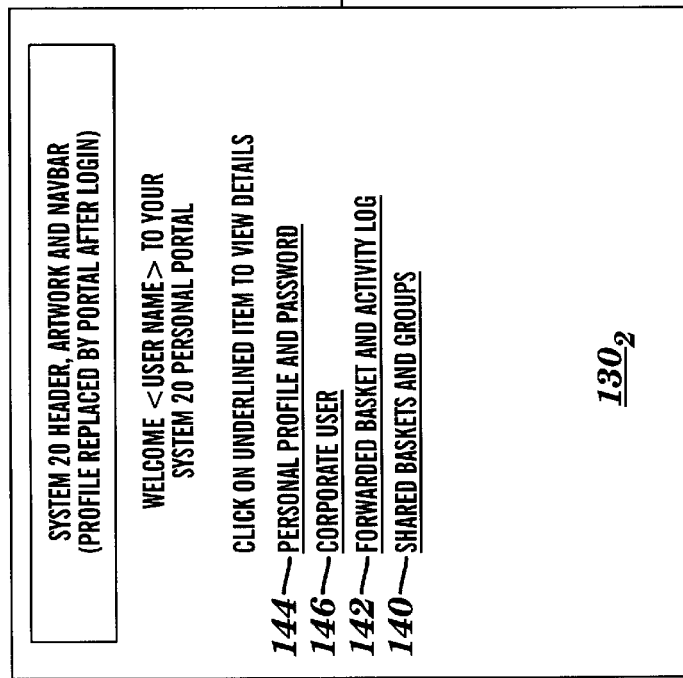
FIG. 15

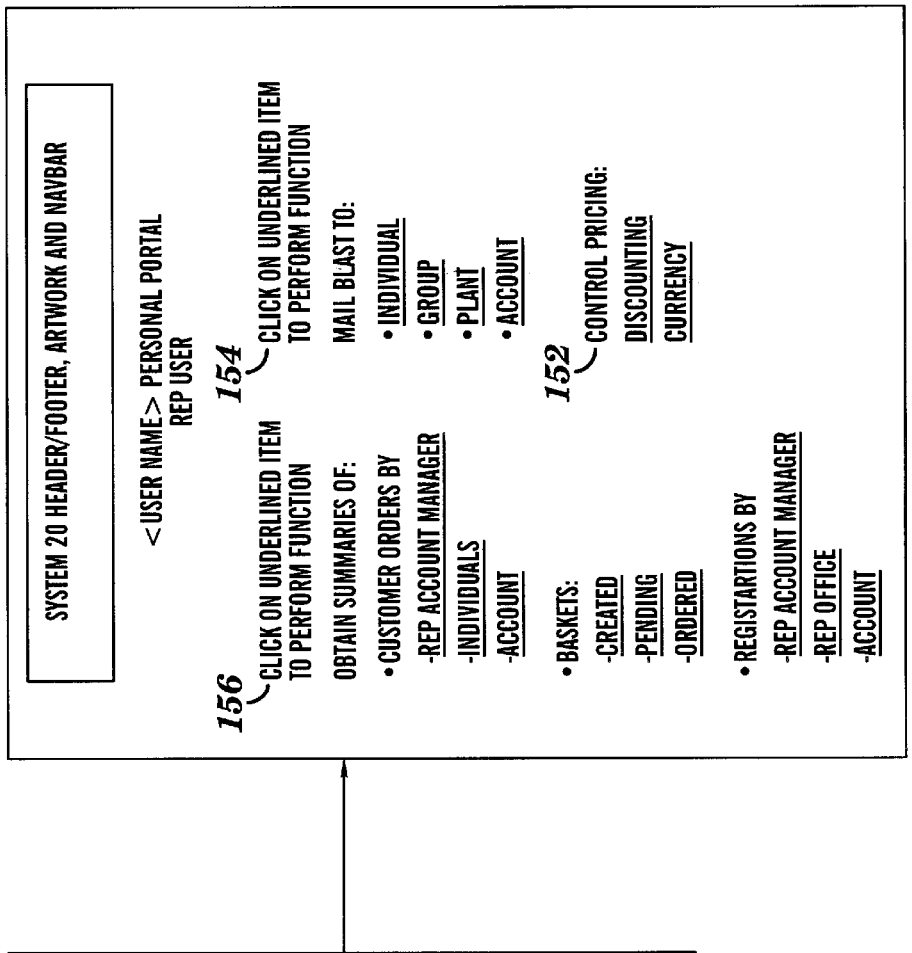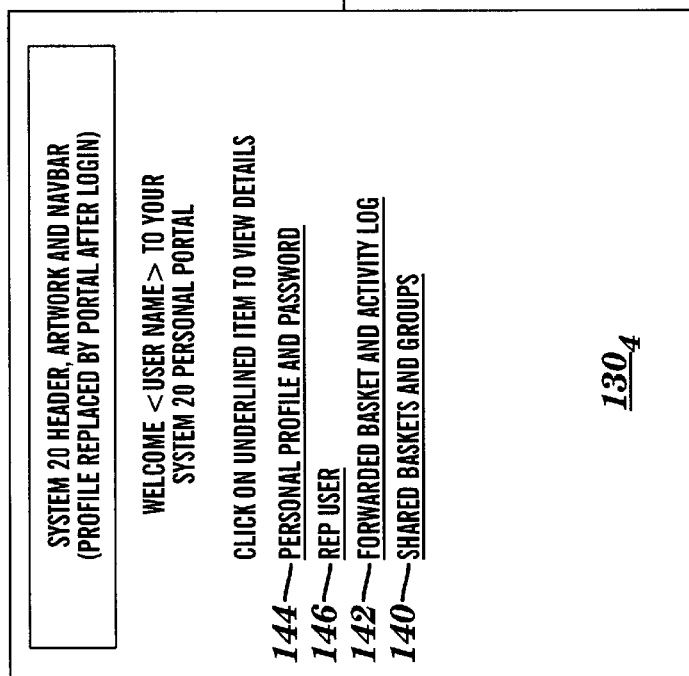
FIG. 17

SHARED SHOPPING BASKET MANAGEMENT SYSTEM

RELATED APPLICATIONS

This application claims priority to U.S. Provisional Application Ser. No. 60/145,825, entitled E-Commerce Site with a Shared Shopping Basket Management System, filed on Jul. 27, 1999; U.S. Provisional Application Ser. No. 60/163,528, entitled E-Commerce Site with a Shared Shopping Basket Management System, was filed on Nov. 4, 1999; U.S. Provisional Application Ser. No. 60/168,271, entitled E-Commerce Site with a Shared Shopping Basket Management System, filed on Dec. 1, 1999; U.S. Provisional Application Ser. No. 60/185,806, entitled E-Commerce Site with a Shared Shopping Basket Management System, filed on Feb. 29, 2000; and U.S. Provisional Application Ser. No. 60/183,138 entitled Personal Portal System For E-Commerce Site, filed on Feb. 17, 2000.

BACKGROUND OF THE INVENTION

1. Technical Field

This invention relates to electronic commerce, and more particularly to an electronic shopping basket implemented through an e-commerce website for business-to-business transaction environments.

2. Background Information

Consumers are growing increasingly comfortable with the concept of shopping and purchasing goods and services on-line, i.e., over the Internet, with many well-known websites displaying various offerings ranging from books and toys to music and countless other consumer products. These consumer-oriented sites generally conduct their sales using similar e-commerce transactional models. Typically, on-line shoppers select products for purchase by depositing them in an electronic (i.e., virtual) shopping cart that is associated with their account information. This cart and its contents are retained for a predetermined time, i.e., about 30-days, in the event an order is not submitted when the cart is initially filled. Once a shopping cart is submitted as an order, it is generally no longer available to the account that created it. Only one active shopping cart is generally allowed per account and only one account is allowed per registered user. Consequently, registered users must operate in a linear shopping process and all business must be conducted and completed, e.g., order submitted, by the same person before other shopping may be undertaken. This arrangement is satisfactory for the common retail or business-to-consumer e-commerce model where one person is responsible for product specification, purchase authorization, and buying.

Unfortunately, this single shopping agent practice is rare in the business world, i.e., in business-to-business transactions. A more common commercial scenario involves two or more individuals acting in a checks-and-balances system. For example, an engineer or maintenance specialist specifies the products based on functional needs or previous product experience and submits this list via a material requisition or request to purchase to their supervisor for approval. The approved requisition is then submitted to a purchasing authority, e.g., buyer, for transmission as a purchase order. After the goods are delivered, an individual will compare the packing list and physical items with the requisitioned items of the purchase order and notify purchasing that the invoice is approved for payment or that there is a problem with the order.

In addition, permitting customers to transact business with a supplier directly over the Internet tends to threaten most established organizations currently in the distribution channel (such as distributors and/or other sales organizations) of corporate purchasing due to a sense of loss of control, i.e., a fear that these organizations will be bypassed.

Thus, a need exists for a shopping model that is more adaptable to the aforementioned business-to-business purchasing cycle and addresses the aforementioned drawbacks.

SUMMARY

According to an embodiment of this invention, a computer implemented method in an interactive medium is provided for conducting commerce. The method includes the steps of providing a site implemented in a digital computer, which is able to communicate electronically with a plurality of remote users. An electronic shopping basket being selectively actuatable into a plurality of states is also provided, and which enables a plurality of users to simultaneously access the shopping basket. Additional steps include assigning to each of the users at least one of a plurality of hierarchically distinct abilities to affect the state of the shopping basket, so that the users are permitted to simultaneously view the status of the shopping basket and sequentially affect the state of the shopping basket to collectively select and approve items for purchase.

In another aspect of the invention, a computer implemented method in an interactive medium is provided for conducting commerce. This method includes the steps of providing a site implemented in a digital computer, and adapting the site for electronic communication with a plurality of remote users. The site is also provided with an electronic shopping basket being selectively actuatable into a plurality of states, the states providing selected levels of access to the users. Further steps include enabling a plurality of users to simultaneously access the shopping basket, and assigning each user to a shopping group, wherein each member of the shopping group has at least one of a plurality of hierarchically distinct abilities to affect the state of the shopping basket. The method also includes enabling the users to become members of a plurality of shopping groups, enabling each shopping group to have a plurality of shopping baskets, and automatically notifying each of the members of a shopping group of any change of state of a basket. The method provides a selectable persistence function to purge the cart upon expiration of a pre-selected time period, and a selectable security function to nominally prevent individual ones of the members from accessing the cart. A search engine to look up items for placement into the shopping cart is also provided. The method thus permits members of a shopping group to simultaneously view the status of the shopping basket and sequentially affect the state of the shopping basket to collectively select and approve items for purchase. Moreover, the method of the invention includes interfacing the site with an Enterprise Resource Planning (ERP) system, by generating an order for the approved items and sending the order to the ERP system.

In a still further embodiment of the present invention, a computer system in an interactive medium is provided for conducting commerce. The computer system includes a site adapted for electronic communication with a plurality of remote users, including an electronic shopping basket being selectively actuatable into a plurality of states, and being simultaneously accessible by a plurality of users. The system also includes a hierarchy table coupled to the shopping basket, so that the state of the shopping basket is selectively affectable according to hierarchically distinct abilities assigned to each of the users. The users are thus permitted to simultaneously view the status of the shopping basket and sequentially affect the state of the shopping basket to collectively select and approve items for purchase.

A yet further embodiment of the present invention includes an article of manufacture for conducting commerce in an interactive environment. the article of manufacture includes a computer usable medium having a computer usable program code embodied therein. The computer usable medium has computer readable program code for providing a site implemented in a digital computer, the site adapted for electronic communication with a plurality of remote users. The invention further includes computer readable program code for providing on the site an electronic shopping basket being selectively actuatable into a plurality of states, and program code for enabling a plurality of users to simultaneously access the shopping basket. Code is also provided for assigning to each of the users at least one of a plurality of hierarchically distinct abilities to affect the state of the shopping basket. The users are thus permitted to simultaneously view the status of the shopping basket and sequentially affect the state of the shopping basket to collectively select and approve items for purchase.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIGS. 3 and 4 are block diagrams of additional aspects of the present invention:

FIGS. 14–17 are functional block diagrams, on a more detailed level, of various embodiments of the aspect of FIG. 13.

DETAILED DESCRIPTION

Figure 1:
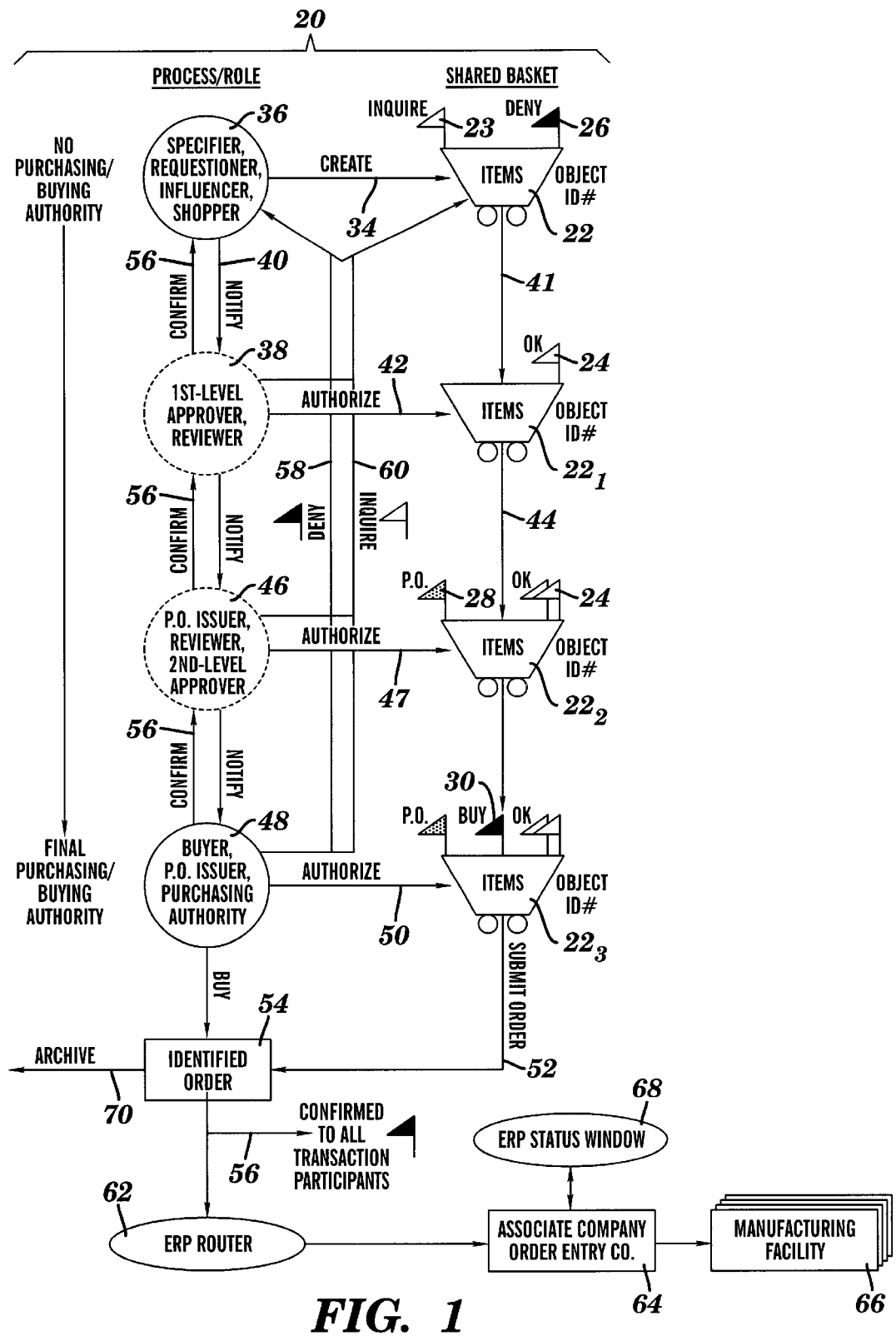
FIG. 1 is functional block diagrammatic representation of the operation of an embodiment of the system and method of the present invention.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Briefly described, the present invention includes a business-to-business e-commerce transaction environment that is implementable on a suitable computer network (i.e., on an Internet website). A system and method is provided that includes an enhanced shopping basket management capability to allow users to more closely align an e-commerce operating environment to their product procurement procedures. A primary concept embodied within the present invention includes sharing a shopping basket object that acquires different states as it passes through the shopping and buying workflow. The concept of a shopping group is introduced to facilitate the multi-step authorization path for placing an order on a given shopping basket. Roles of individuals in the shopping group are defined in the context of their effect on the shopping basket object and its progress culminating in an order being placed.

Once a person registers to conduct business on the site, they can see pricing and perform product configurations. Any special formal pricing arrangements with the registrant's company, i.e., a negotiated pricing agreement (NPA) are invoked during shopping sessions. Catalogs of frequently purchased items can be stored in a customized account for use during shopping sessions. The present invention provides shopping basket management functionality to address the need to share product lists with different levels of approval and buying authorization. Ramifications of the shared shopping basket on registration are also disclosed. Any number of conventional payment methods may be used, such as credit or corporate purchasing cards, purchase orders and letters of credit.

Where used in this disclosure, the terms "shopping basket" and "shopping cart" are used interchangeably to denote an electronically generated (i.e., virtual) object capable of receiving electronic objects associated with selected items prior to purchase. A shopping "group" is a related membership of registrants who are involved in the same purchasing activities on behalf of a client. These group members may be alternately referred to as "users", "members", "participants", and/or "registrants", who may be internal or external to the client organization. Individual members may belong to any number of shopping groups. The "client", "client organization", "customer", "end-user company", and "order-entry company" shall interchangeably refer to the ultimate recipient of an order placed using the present invention. The shopping group is "owned" by the client organization and has administrative authority over it. The term "computer" refers to a conventional device and/or system having a microprocessor and memory, including a conventional personal computer (PC), server, and/or embedded processor.

Referring now to the Figures, the system and method of the present invention will be more thoroughly described.

Shared Shopping Basket Environment

Turning now to FIG. 1, operational parameters of one embodiment of the shared shopping basket system 20 of the present invention is shown. Basket object 22 moves through various steps (states) in a shopping environment in accordance with various roles performed by participants (i.e., group members) involved in procurement transactions. These individuals may be internal or external to the ordering company. Colored pennants 23, 24, 26, 28, and 30 affixed to the cart 22 represent different states of approval. Each basket is uniquely identified for later retrieval. This system 20 is customizable to the actual purchasing procedures used in many companies. Examples of such customized versions of system 20 are described hereinbelow with respect to FIGS. 5A–7B.

As shown, the members typically perform different operations that culminate in an order being place on a vendor. This workflow is an authorization chain for the people involved in a transaction. Some of the categories of participants and the operations they may perform on a basket are identified in the following Table I:

TABLE I

Operations Performed by (Internal and/or External) Group Members

| | Reps & Other Agents | Account Manager | Engineering | End-Users (Customers) |
|---|---|---|---|---|
| Specifier, Requisitioer, Influencer, Shopper | Create Review Edit | Create Review Edit | Create Review Edit | Create Review Edit |
| 1st Level Approver, Reviewer | Review Approve Inquire Deny | Review Approve Inquire Deny | | Review Approve Inquire Deny |
| P.O. Issuer, Reviewer, 2nd Level Approver | | | | Review Approve Inquire Deny |
| Buyer, P.O. Issuer, Purchasing Authority | | | | Review Approve Inquire Deny |
| Identified Order | Problem Resolution Change Order | Problem Resolution Change Order | | Problem Resolution Change Order Close-out after receipt of goods |

As shown, participants (i.e., group members) in the workflow may perform one or more of the following operations: 1) Create a basket by entering contents into it from specifications to requisition items; 2) Notify one or more authorizing individuals to Review the basket contents and Approve them for purchase; 3) Present (Notify) the approved basket to a buying authority to submit the basket contents with a valid payment method indicated to the system 20 for processing (Buy). When an identified order is created, it is confirmed (Confirm) to all participants. Ancillary functions also may be performed on the basket by authorized personnel such as making an inquiry (Inquire) about the basket contents, denying (Deny) authorization to purchase basket contents, and editing (Edit) the basket contents. After an order is placed, certain individuals may also have rights to change an order (Change Order) and participate in problem resolution. After an order has been received, the basket may be Closed-out when the goods delivered are verified against the order. A request to pay the invoice may also be issued at this time.

As shown, the system 20 of the present invention creates an object that uniquely identifies the shared shopping basket 22 and facilitates desired workflow. Each workflow step results in the basket 22 undergoing state changes representing its progress in the workflow. The colored pennants 23, 24, 26, 28, and 30 are used to represent these state changes. After the shopping cart is created (i.e., completed) 34 and ready for approval, the initiator 36 Notifies 40, i.e., by selecting a notify button (icon) (not shown) with a mouse pointer or other suitable means familiar to those skilled in the art. This Notification 40 advances 41 the cart to its next state, shown as cart $22_1$. The next person in the workflow is given access to the basket for review and approval. In the example shown in FIG. 1, this next person is the $1^{st}$ level approver or reviewer 38. The person selects an Authorize or Approve button, as at 42 which flags the cart with an OK pennant 24 and advances 44 the cart to the next person in the chain of authorization, i.e., $2^{nd}$ level approver or P.O. Issuer 46. This member 46 may add (i.e., authorize) 47 another OK flag 24 and/or P.O. (purchase order) pennant 28 depending on this member's role. The cart in this state is shown as cart $22_2$. The cart eventually, regardless of the number of steps, arrives at the final buying authority 48 who selects a Submit Order button (not shown) to authorize 50 and apply a Buy pennant 30 to cart $22_3$, as shown. When the order thus confirmed, the cart $22_3$ is submitted 52 as an order 54 and may be confirmed 56, i.e., with a Confirm pennant (not shown) that is visible to all members of the shopping group.

As also shown, each member 38, 46, and 48 may Inquire 60 by placing a respective flag onto the cart. If the cart contents are questioned, members 38, 46, and/or 48 may Inquire 60 to place an Inquiry pennant with a note about the question or comment. The initiator 36 is then expected to clarify the inquiry and/or edit the contents of the cart. The cart is placed on-hold (i.e., placed in read-only status for all but the initiator 36) during this inquiry period and no advancing operations can be performed on it. When the inquiry is clarified to the satisfaction of the person seeking it, the cart can be released by selecting a Release button (not shown). Similarly, any of the members (i.e., 38, 46, and 48) so authorized, may reject the shopping cart by initiating a Deny action 58 and adding comments as appropriate.

The shopping cart $22_3$ object is preferably available to the shopping group, preferably with an order number appended, so that the cart can be closed-out after the goods are received. The cart then may be archived 70 with the order for later retrieval should a problem arise. Any suitable approach for uniquely identifying the cart may be used. For example, a Basket ID corresponding to a unique object path including indicia corresponding to an End User company, shopping group, and sequence number may be used. The order number could be appended to this path to complete the identification process.

Additional optional steps include interfacing with an Enterprise Resource Planning (ERP) system, such as available from Baan Co., Oracle Corp., or SAP AG. For example, the order 54 may be sent to an ERP router 62 which is communicably coupled to an Order Entry component 64, ERP status window 68, and/or manufacturing facility 66 of the client company. Such ERP interconnectivity will be discussed in greater detail hereinbelow with respect to FIG. 12.

The shared shopping cart system 20 shown and described with respect to FIG. 1 allows for a mix of personnel inside and outside the end-user company to participate in any of the steps.

The workflow and authorization process is created during registration as shopping groups are formed to define the environment in which the shared basket will exist. Shopping groups and registrant roles are discussed in greater detail hereinbelow with respect to FIG. 2.

Registration Functionality and Introduction to Shopping Groups

Figure 2:
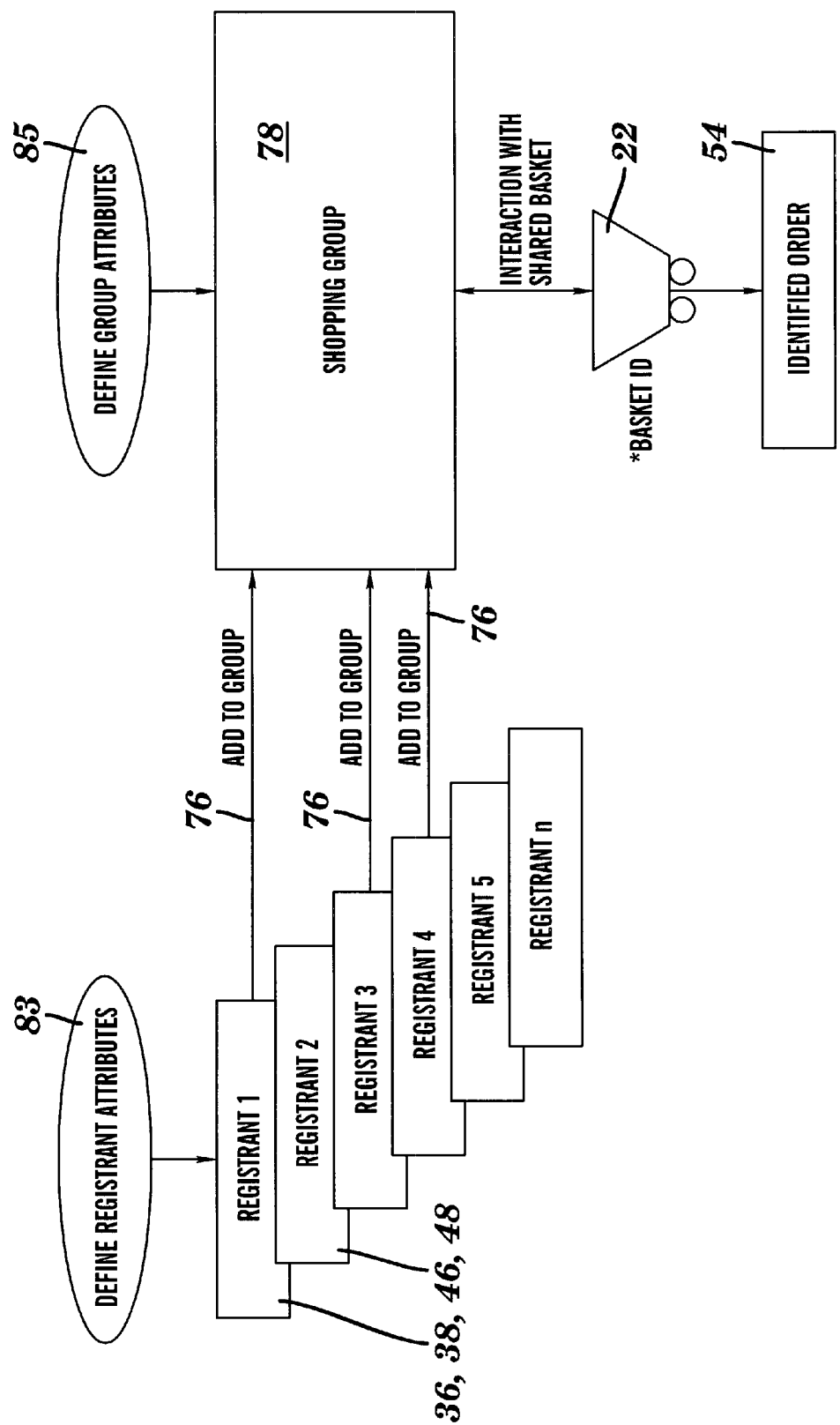
FIG. 2 is functional block diagram, from a high level, of various aspects of the present invention.

FIG. 2 outlines registration process functionality provided to support the shared shopping basket model discussed hereinabove. As shown, any desired number n of registrants (i.e., group members) 36, 38, 46, 48 may be added 76 to a shopping group. Registrant Attributes may be Defined 83 (as listed in FIG. 3) and Shopping Group Attributes Defined 85 (as listed in FIG. 4) so that group 78 may interact with shopping basket 22 to produce an order 54 as discussed hereinabove. As shown in FIG. 3, in addition to conventional address information 80 required for correspondence, billing, and shipping, various E-commerce and/or Basket Management functions 82 as listed, may be individually optionally attributed to a particular registrant 36, 38, 46, and/or 48. The Relationships attribute 84 indicates whether the registrant is internal or external to the customer. Shopping Group Membership attribute 86 defines which, if any, Shopping Group or Groups a registrant will belong.

FIG. 4 shows some attributes of Shopping Group 78. These are preferably assigned before a registrant may become a member of the group. The customer owns the Shopping Group 78, and thus has authority to select and define each of the group attributes. These attributes include the group name 88 and the group membership 90. Advantageously, the customer thus has the ability to limit membership to only those registrants who either work for or are otherwise associated with the customer. An additional attribute of the group 78 definable by the customer is the hierarchy of authorization (i.e., the authorization path) 91. More than one registrant may be assigned the same level of authority, i.e., to provide some redundancy and help eliminate bottlenecks. Additional variations of registrant and shopping group attributes will be discussed hereinbelow with respect to FIGS. 9–11 and Table II.

Shopping Session Scenarios with Shared Basket Transaction

Having described an embodiment of the invention, operation of typical shopping sessions using the Shared Shopping Basket system 20 will be discussed with respect to FIGS. 5A–7B.

Figure 5B:
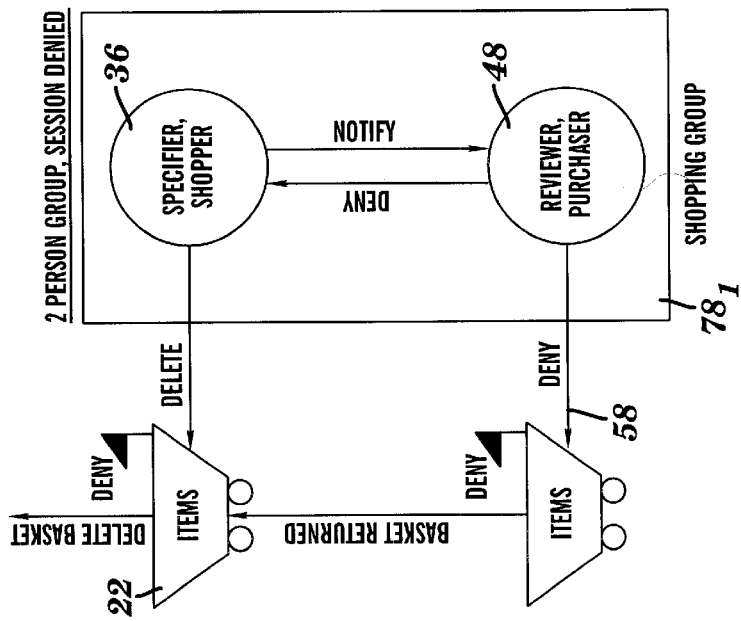
FIGS. 5A–5D are functional block diagrammatic representations of the operation of an alternate embodiment of the present invention.
Figure 5A:
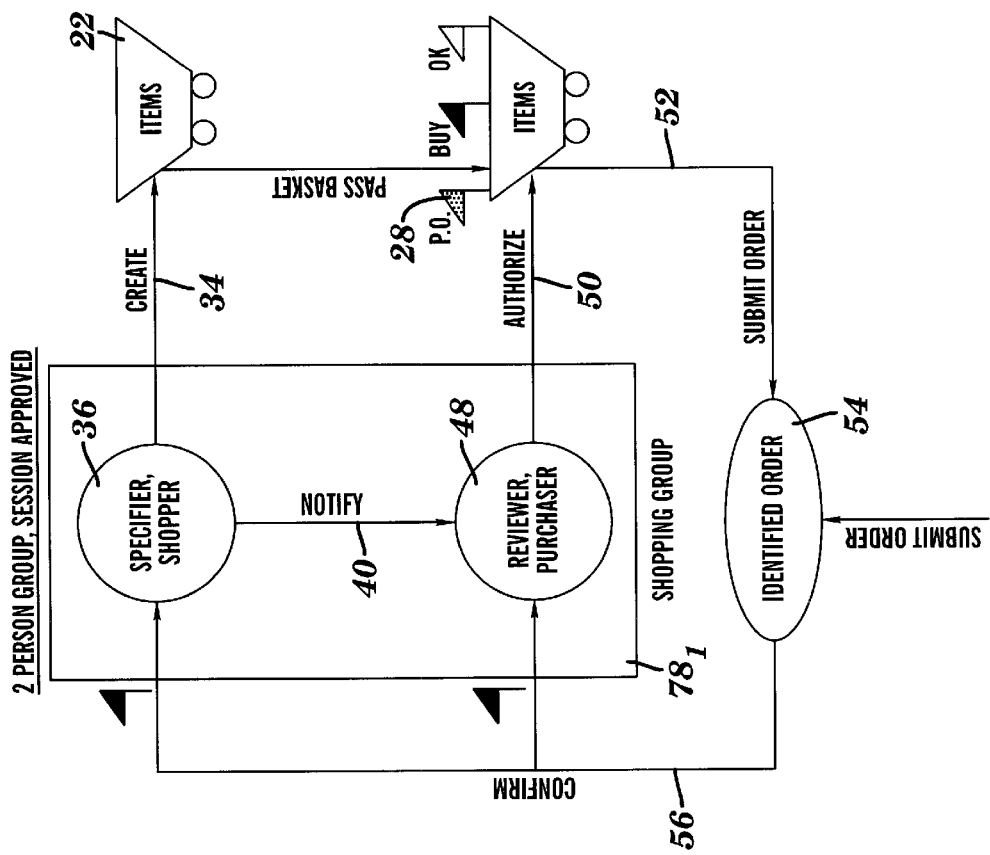

FIG. 5A depicts a simple two person Shopping Group $78_1$ including a shopper 36 and buyer 48, in which the transaction (purchase) is ultimately approved. As shown, the shopper 36 creates/completes 34 the basket 22 and notifies 40 the buyer 48 that it is ready for ordering. The buyer 48 authorizes 50 and submits 52 the order 54 with a P.O. number entered (as indicated by P.O. flag 28). The order is confirmed 56 to the shopper and to the buyer.

As shown in FIG. 5B, a buyer 48 denies 58 the basket 22 and both members of the Shopping Group $78_1$ are notified by a Deny pennant. A note (not shown) accompanying the denial may indicate that the products ordered are not approved models.

Figure 5C:
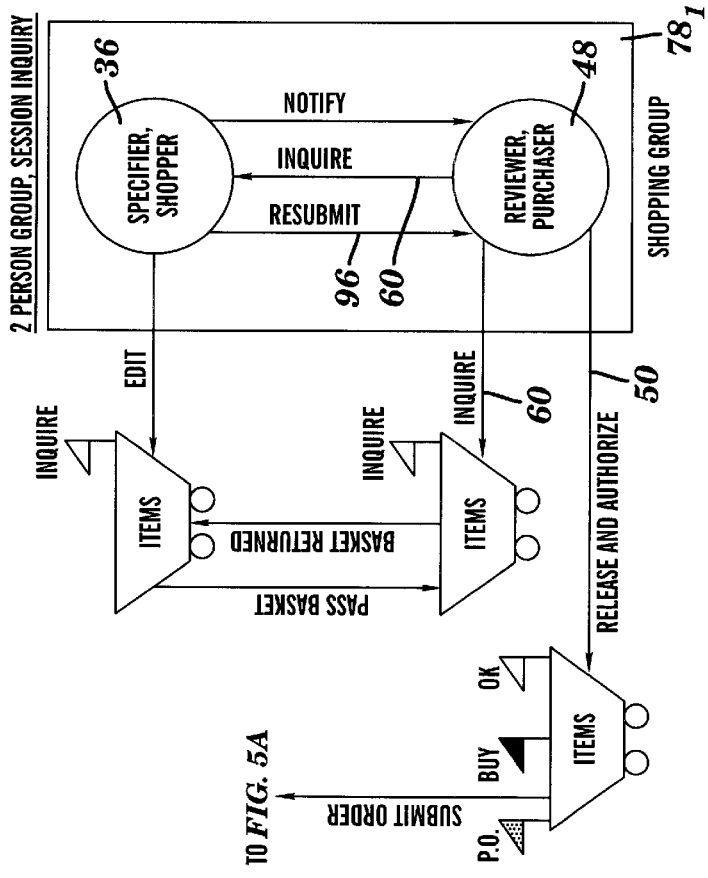

In FIG. 5C, the buyer 48 makes an inquiry 60 to the shopper 36 about an item in the basket (e.g., "do these items require tags per company policy?"). The basket acquires an Inquire state (i.e., read-only status) that inhibits further processing. The shopper responds (i.e., resubmits the basket) 96 to the inquiry, (e.g., "this was an oversight and the affected items have been revised"). The buyer releases the Inquire 60 hold and authorizes 50 the basket for ordering as in FIG. 5A.

Figure 5D:
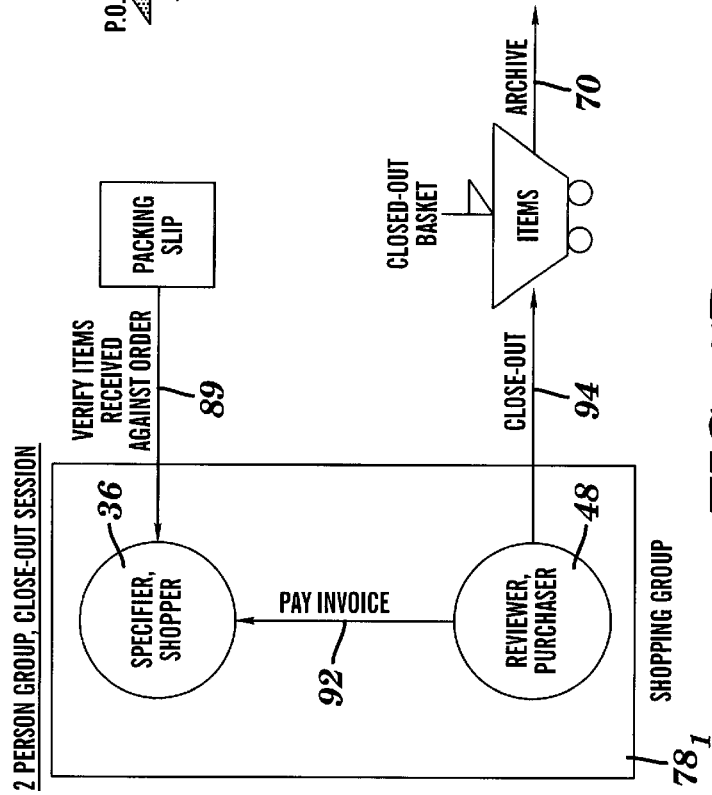

As shown in FIG. 5D, the shopper 36 may verify (i.e., reconcile) 89 items received as ordered, and then send a Pay Invoice message 92 to buyer 48. The buyer may subsequently Closed-out 94 the basket, which is then archived 70.

Figure 6A:
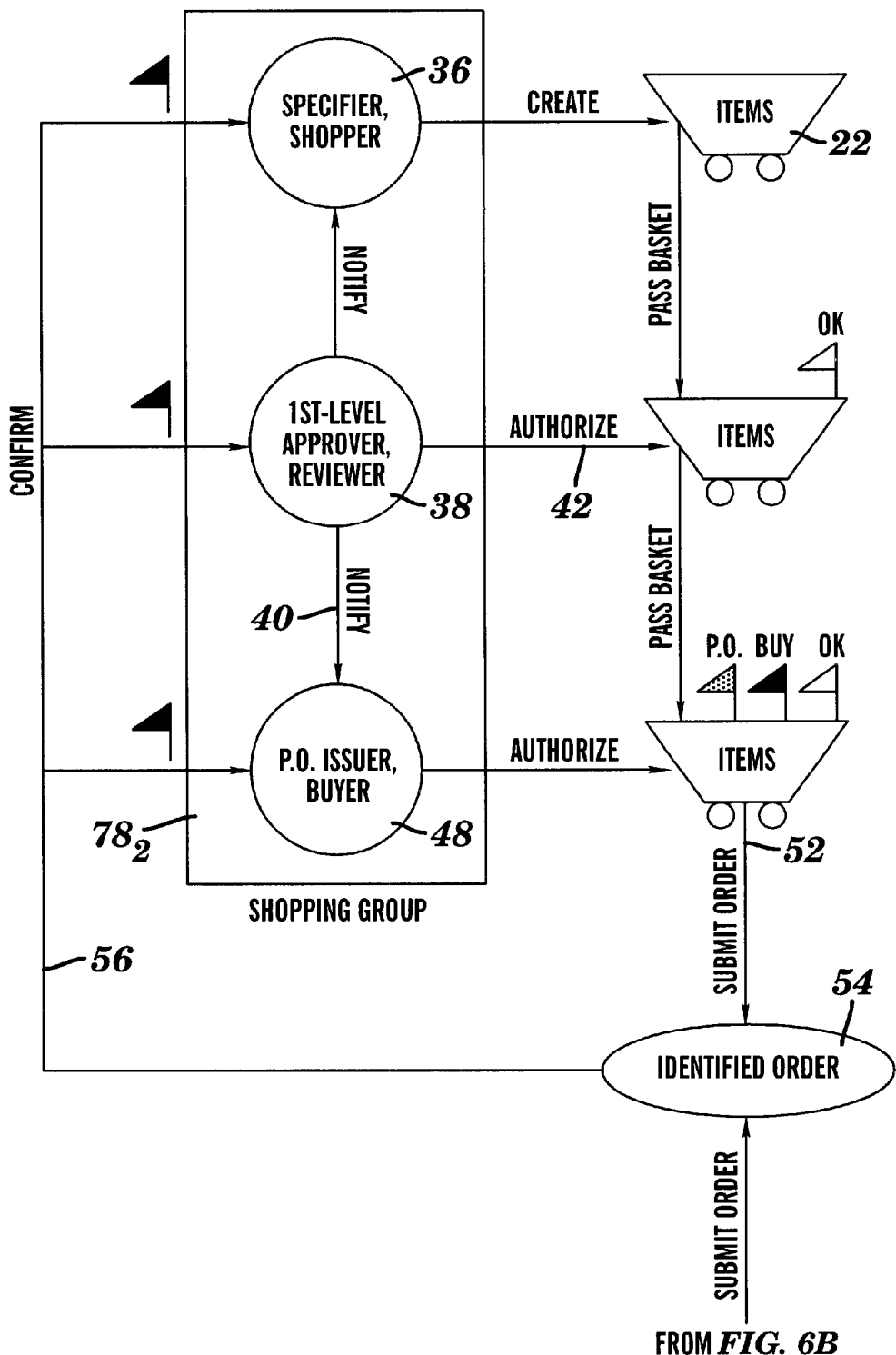
FIGS. 6A–6B are views similar to those of FIGS. 5A–5B, of a further embodiment of the present invention.
Figure 6B:
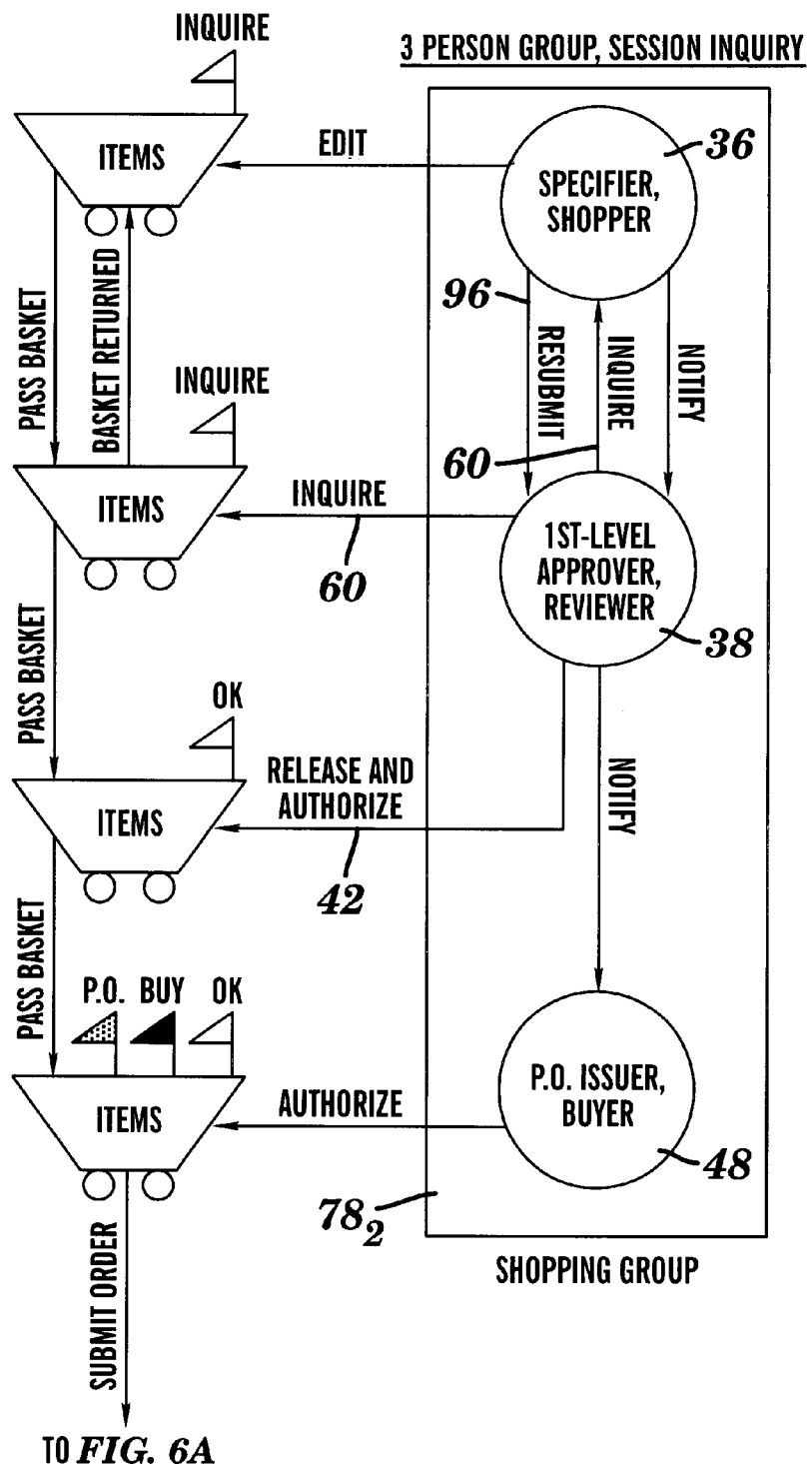

FIG. 6A shows a three person Shopping Group $78_2$ in which one of the members 38 approves 42 the shopping basket 22 for its creator 36, then notifies 40 the buyer 48 to submit the basket for ordering. Once the order is submitted 52, the confirmation 56 is presented to all members of the Shopping Group $78_2$. Turning to FIG. 6B, the $1^{st}$-level approver 38 makes an inquiry 60 about the basket contents, i.e., is the quantity correct. The shopper 36 responds by resubmitting 96 the basket 22 with an appropriate message, i.e., that the quantity has been verified. The approver 38 then releases and authorizes 42 the basket 22 for processing by (and notification 40 of) the buyer 48. During the inquiry 60, the buyer 48 may review the basket 22 and its status, but cannot process it since it is on hold (read-only) prior to his involvement. Only the $1^{st}$-level approver 38 has privileges to Release the basket 22.

Figure 7A:
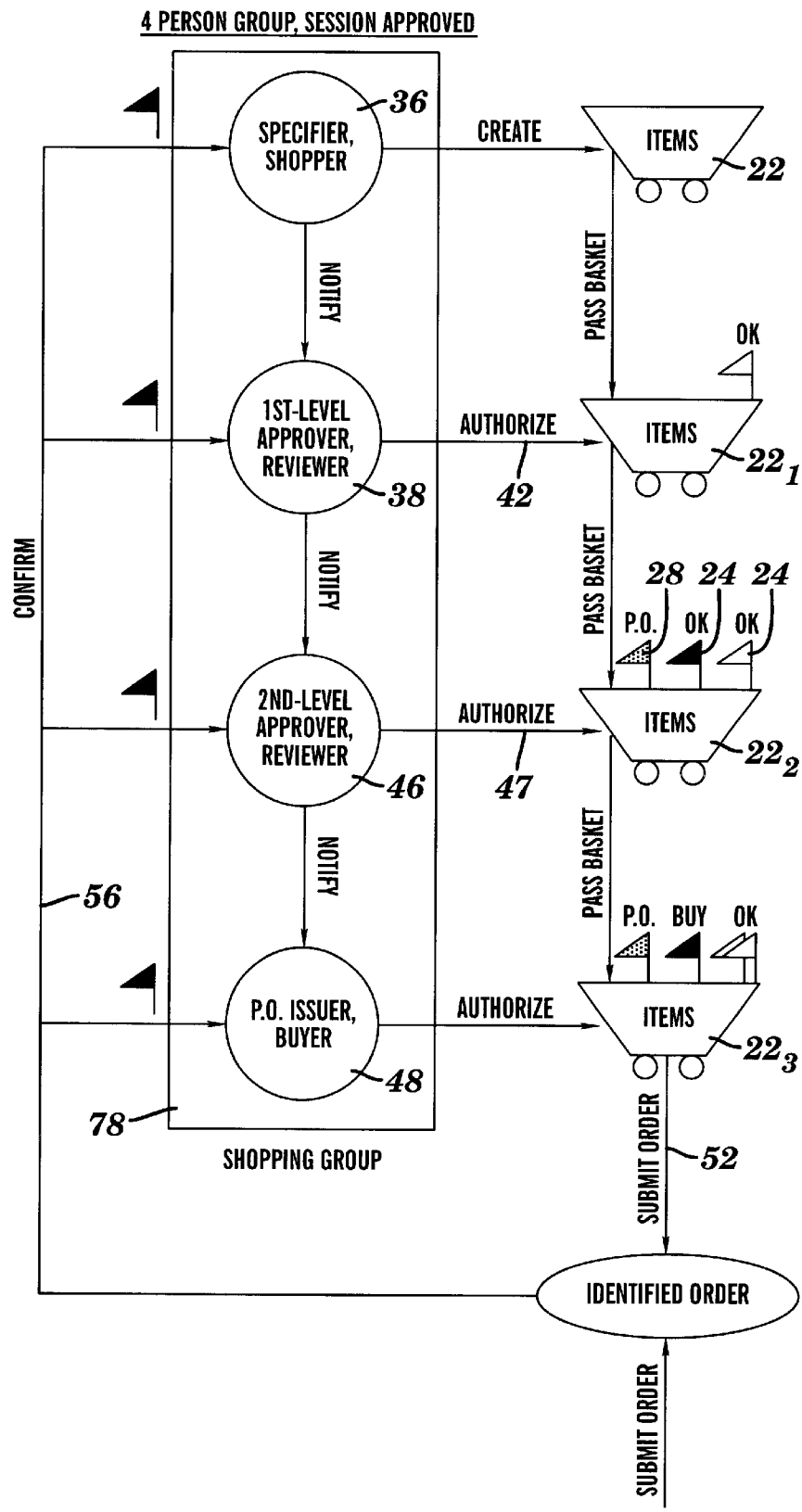
FIGS. 7A–7B are views similar to those of FIGS. 5A–5B, of a still further embodiment of the present invention.

Turning now to FIG. 7A, this scenario is substantially similar to those discussed hereinabove, however two levels of authorization are required before the order can be submitted. As shown, the $2^{nd}$-level approver 46 also has the ability to assign a P.O. 28 to the basket, but cannot submit the order 52. Two OK pennants 24 appear on the shared shopping basket $22_2$ to indicate both approvers 38, 46 have authorized 42, 47 the basket contents. All shopping group members receive an order confirmation 56. In this scenario, the shopper 36 may be an agent of the customer whose responsibility is to create the basket 22 from functional specifications; the $1^{st}$-level approver 38 may be the agent's client in the customer's organization; the $2^{nd}$-level approver 46 may be the $1^{st}$-level approver's supervisor; the buyer 48 may be an employee in the customer's organization. In another variation, the shopper 36 may include someone in the customer organization; the supplier's account manager for the customer organization may be the $1^{st}$-level approver 38; the shopper's supervisor may be the $2^{nd}$-level approver 46; while the buyer 48 may be an employee of the customer.

Figure 7B:
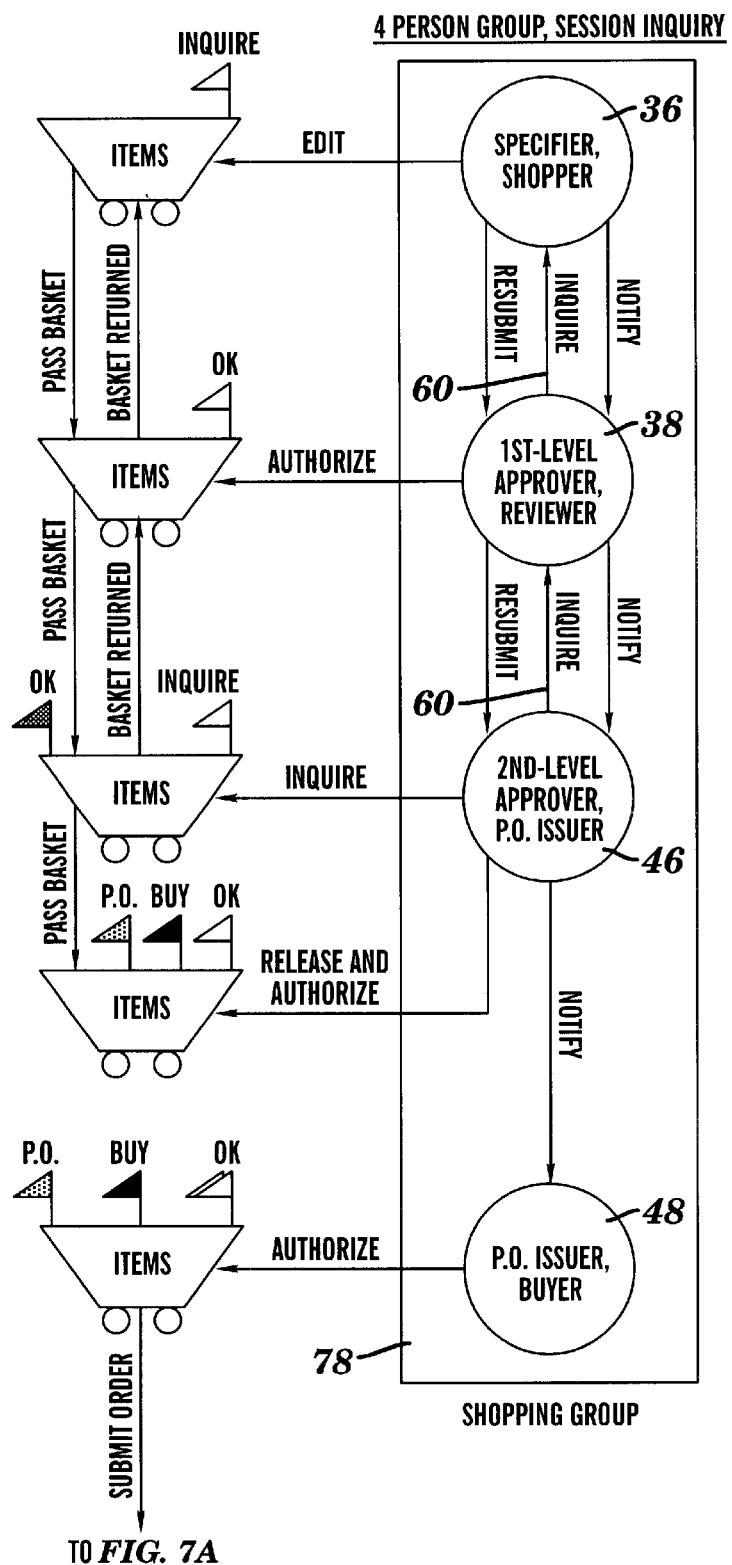

The scenario shown in FIG. 7B is substantially similar to that of FIG. 7A, while including an inquiry 60 from the $2^{nd}$-level approver 46.

The example scenarios described hereinabove with respect to FIGS. 5A–7B represent only a sampling of the flexibility possible with the system described in this proposal and are not intended to serve as limits on the capability provided by the system 20 of the present invention.

The Shared Shopping Basket management system 20 of the present invention advantageously advances the technology of business-to-business e-commerce transactions over the Internet. It allows the creation of electronic workflow to effectively facilitate shopping and buying procedures in a complex corporate purchasing environment. It also substantially removes a significant barrier to on-line corporate purchasing by allowing existing authorization relationships to work without additional administrative burden. It also advantageously provides an efficient and streamlined means for a salesperson, account manager, or other interested party to remain in the purchasing loop. This particular aspect will be discussed in greater detail hereinbelow with respect to FIGS. 13–17.

Having described an embodiment of the system 20, the following is a more detailed description of some of the specific and/or optional elements thereof. For example, at least three methods of notification 40 may be used alone or in combination in system 20. The notification may include automatically emailing the next person or persons involved in the process; automatically highlighting a Shopping Basket Pending window on the system 20 website about who needs to act next; and/or manually emailing a Shopping Group member. A registrant 36, 38, 46, 48 (FIG. 2) may choose how they wish to be notified when they register.

Registration in the system 20 preferably requires that all users include an email address for security purposes. The authorization hierarchy 91 (FIG. 4) created for Shopping Groups 78, 78$_1$, 78$_2$, preferably includes an inherent (i.e., automatic) notification process. An individual's name and/or email address may be flagged for notification of action required to advance the shopping basket toward an order. This notification 40 may appear in an email with basket identification information or in a status window associated with a shopping basket that appears only to individuals upstream or downstream in the authorization hierarchy, depending on the kind of notification required.

Figure 8:
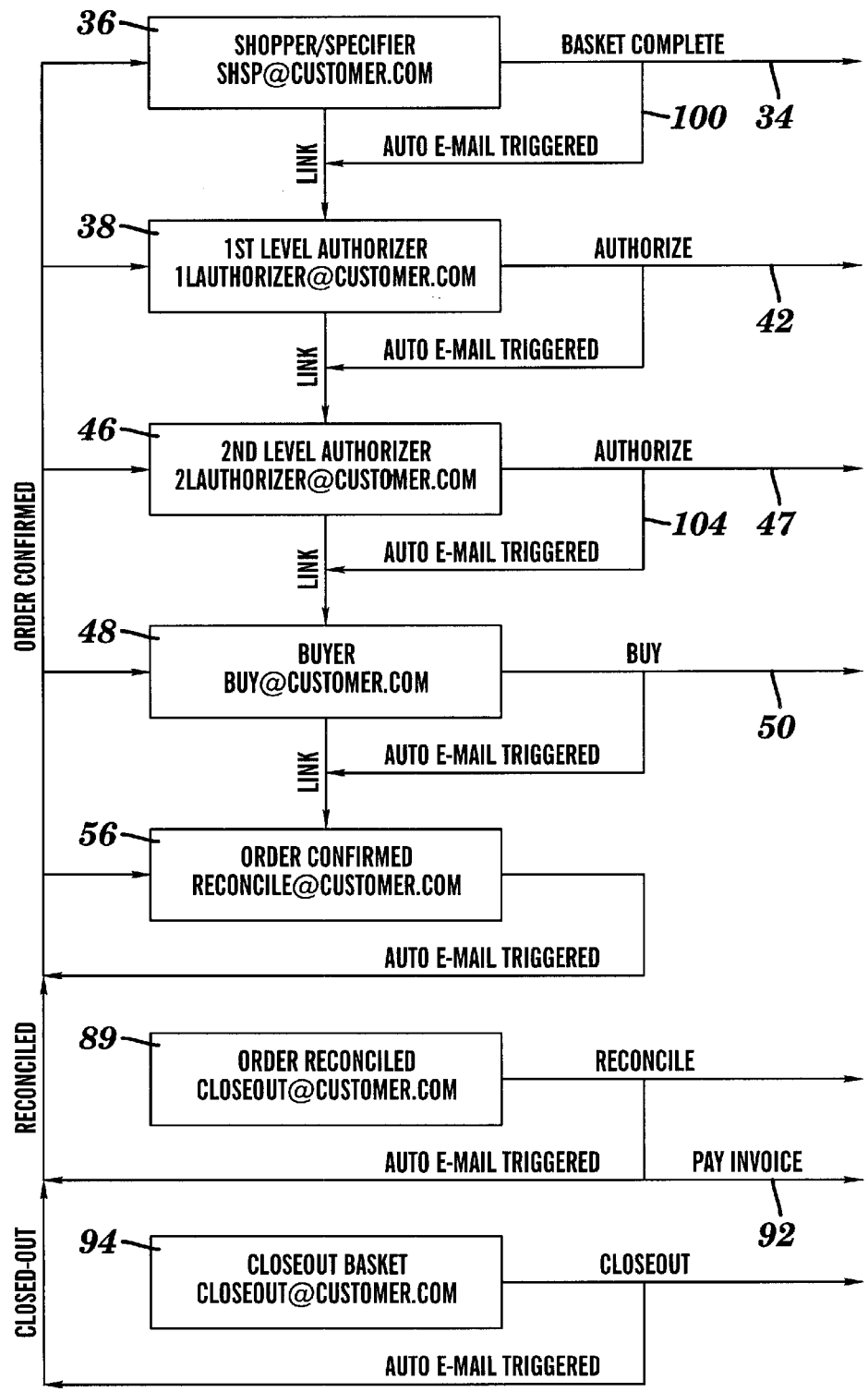
FIG. 8 is a block diagrammatic view showing additional aspects of the present invention.

Turning now to FIG. 8, various notification situations encountered during the shopping experience are shown. A typical shopping notification 40 by automatic email may involve the Shopper/Specifier 36 completing their function of filling the cart/basket 22 with required items and clicking Basket Create/Complete 34. The 1$^{st}$-level Authorizer 38 receives an automatically generated email 100 from the Shopper/Specifier 36, which may include the shopping basket ID, date, shopping basket name/description (if provided), who the notification is from, any cc: for advise to others, and a message describing what action the recipient should be taking. In some Shopping Groups, multiple emails 100 may be issued, such as in the event more than one individual is authorized at a given level. When the recipient 38 Authorizes 42 after reviewing the basket contents, the next email in the sequence is triggered. Ultimately, Buyer 48 receives an email 104 to purchase the shopping basket contents. When the order is confirmed 56, all participants in the Shopping Group are notified by email including the confirmation number and any other desired order reference information. After the order is received, the shopping group member responsible for reconciling 89 delivery against the order retrieves the basket and notifies by email affected Shopping Group members so the invoice can be paid 92 and the shopping basket eventually closed-out 94.

The Shopping Basket Pending window notification method performs similarly to the email method except Shopping Group members see a list of shopping baskets in a window when they login to system 20, i.e., through their browser. Baskets pending approval preferably appear only to individuals who are required to take action. When they select a basket, details about it appear in the window with the appropriate action key(s) activated. This notification approach promotes collaboration among the members of the Shopping Group 78, 78$_1$, 78$_2$.

The manual email method allows any member of a Shopping Group 78 to notify any individual or the entire group about a shopping basket for review or other action. A message may be included in the notification.

Figure 9:
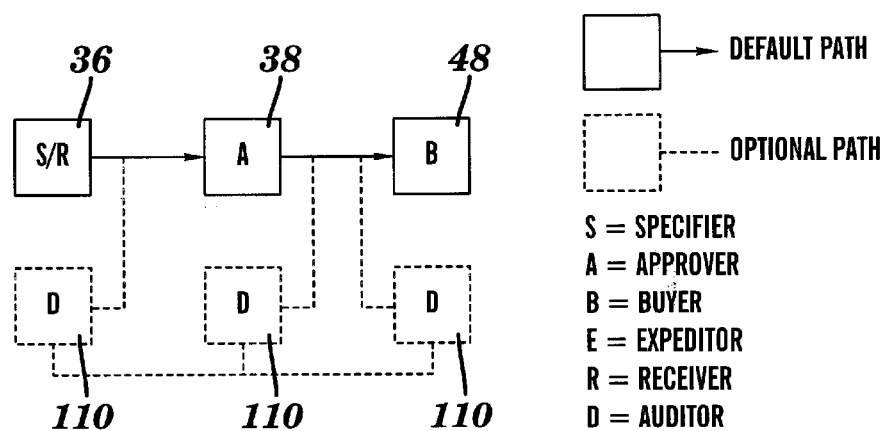
FIGS. 9 and 10 are block diagrammatic views showing additional aspects of the present invention.
Figure 10:
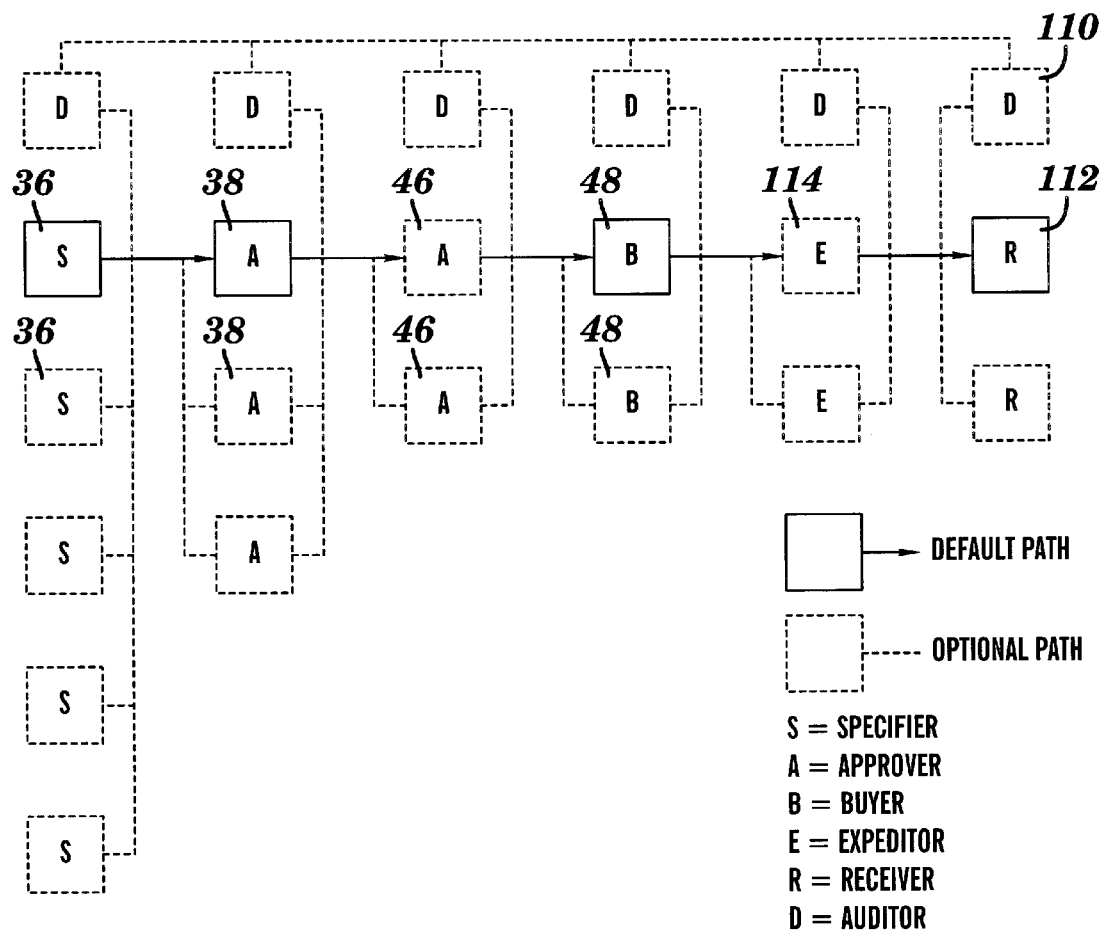
Figure 11:
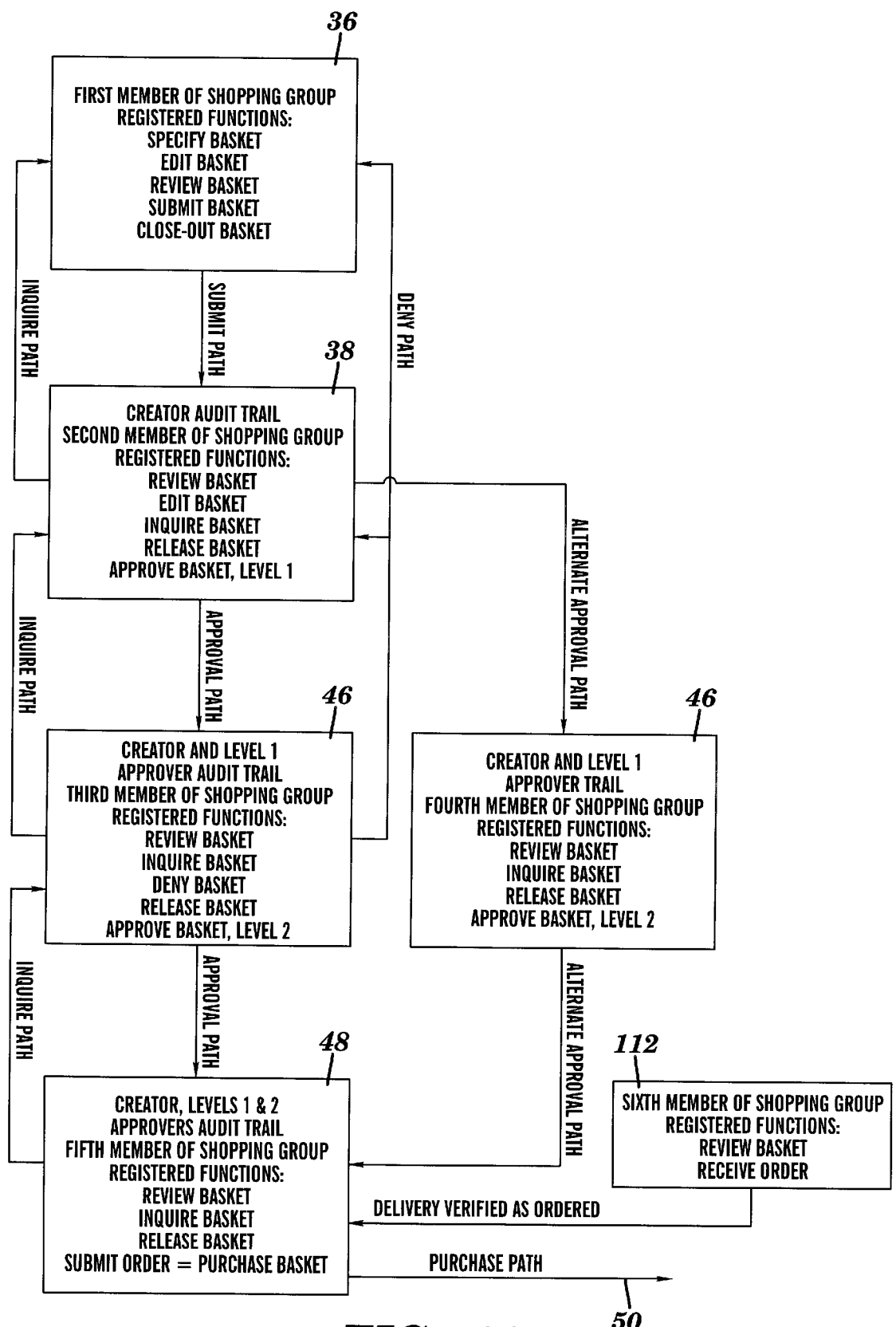
FIG. 11 is a block diagram showing additional features of an embodiment of the present invention.

Turning now to FIGS. 9–11, additional aspects of shopping group administration and operation, registrant functions and attributes, and shopping cart/basket functions and attributes, as mentioned hereinabove with respect to FIGS. 3 and 4, will be discussed in greater detail.

As discussed hereinabove, the shopping group defines the sequence or flow of a purchasing cycle. Members occupy a sequence level in a hierarchy that is defined when a group is formed. More than one member can occupy the same level. Predefined sequences of common procurement authorization environments may be used to facilitate assigning of members. Custom sequences may also be defined. The functions that individual members can perform, e.g., create basket, authorize basket, edit basket, approve basket, buy basket, inquire basket, are preferably defined at registration time or during subsequent edits to registrant profiles. Preferably, only one shopping group can own a basket and a group may own more than one basket.

As shown in the following Table II, administrative functions associated with shopping groups include: Create and Name Group; Assign Group Password; Assign Group Administrator(s); Assign Group Members; Select Group Hierarchy; Define Group Hierarchy; Edit Group Membership; Edit Group Hierarchy; Dissolve Group; Review Groups; Review Status. A Reporting function may also be provided which allows the administrator(s) to create or print the contents shown on their screen. It may be desirable to perform these administrative functions using an object-oriented graphical tool such as VISIO™ to make creating and modifying shopping groups easy. Table II summarizes some preferred default and optional functions performed by Administrator(s).

TABLE II

Functions Performed vs. Primary Role in Shopping Group

| Functions Performed | Primary Role | | | | | | | |
|---|---|---|---|---|---|---|---|---|
| | Specifier | Authorizer | Buyer | Expediter | Receiver | Auditor | Superuser/Owner | Administrator |
| Create/Specify | X | | | | | | | X |
| Edit | X | O | O | X | | | X | |
| Review | X | X | X | X | X | X | X | |
| Submit | X | O | O | X | | | X | |
| Approve | | X | | X | | | X | |
| Order | | | X | O | | | X | |
| Receive | O | | | | X | | X | |
| Pay | | | X | | | | X | |
| Close-out | X | | O | | | | O | |
| Retrieve | O | O | O | | | X | O | |
| Inquire | | X | X | X | O | | X | |
| Release | | X | X | X | O | | X | |
| Deny | | O | X | | | | O | |
| Catalog | X | | | | | | O | |
| Copy | X | | | | | | X | |
| Import | O | | | | | O | O | |
| Export | O | | | | | O | O | |
| Delete | O | O | | | | | O | |
| Audit | | O | O | | | X | O | |
| Purge (TBD) → | | | | | | | | |
| Create & Name Group | | | | | | | | X |
| Assign Group Password | | | | | | | | X |
| Assign Group Admin(s) | | | | | | | | O |
| Assign Group Members | | | | | | | | X |
| Select Group Hierarchy | | | | | | | | X |
| Define Group Hierarchy | | | | | | | | O |

TABLE II-continued

Functions Performed vs. Primary Role in Shopping Group

| Functions Performed | Primary Role | | | | | | | |
|---|---|---|---|---|---|---|---|---|
| | Specifier | Authorizer | Buyer | Expediter | Receiver | Auditor | Superuser/Owner | Administrator |
| Edit Group Membership | | | | | | | | X |
| Dissolve Group | | | | | | | O | |
| Review Groups | | | | | | | X | |
| Review Activity Status | | | | | | | X | |
| Reporting | | | | | | | X | |

X = Default function
O = Optional function

Assign Group Administrator(s); Create and Name Group; Assign Group Password:

This collection of functions initiates a shopping group by providing a unique name and password for access. The group is associated with a client organization and assigned administrator(s) who most likely are creating the group. This group of functions are preferably completed before other functions defined later become active, and should be completed in the order in which they are defined. Operations performed in this process include:

Assign group administrator(s) from list of registered users (must be registered with group administration privileges) from the client organization.

System requests administrator to open shopping group administration window, which makes the system assign (automatically) a unique internal identifier to a membership of shoppers with the creation date.

System requests administrator to assign an alphanumeric character descriptor to be associated with this internal identifier.

Administrator assigns and confirms a group password.

Administrator defines client organization and location, and system assigns customer number, if available.

Save or edit group properties such as group name, group password, client organization name, number and location, and group creation date.

Assign Group Members; Select Group Hierarchy:

This pair of functions allows the group administrator to add individuals to the shopping group created by the above functions and to choose either a pre-defined authorization hierarchy or to custom define such a hierarchy. For example, as shown in FIG. 9, a predefined hierarchy of specifier 36, approver 38 or 46 and buyer 48 may be provided, with options for auditors 110 to observe or track the progress of the basket at each level, as shown in phantom. In this configuration, specifier 36 also serves as the receiver of the specified items. Similarly, as shown in FIG. 10, a more complex predefined hierarchy may include buyer 36, approver 38, buyer 48, and a distinct receiver 112. Additional options, shown in phantom, include a second level approver 46, and expeditor 114, and redundant members and/or auditors 110 at any or all levels. The default paths are preferably permanent and cannot be altered. In the custom mode these hierarchies are available for editing, modifying and saving as a new hierarchy. The optional path entries (shown in phantom in FIGS. 9 and 10) are preferably selected during shopping group hierarchy definition. Each optional entry selected allows a member's name and/or other identifying indicia such as location, etc. to be assigned to that step in the sequence. In the configuration of FIG. 9, the specifier had the optional receive function assigned to it during registration. The single letter abbreviations identified in the legend refer to the primary role in shopping group functions assigned to each member during registration.

Members preferably may only be added to a group if the logged-in administrator has valid credentials and if the members are fully registered. Members of the shopping group may be selected from those registered as employees of a client organization and those registered as affiliated with that organization. A list of members may appear in a window from the registered users affiliated with the client. The default affiliation may be the member's company name. An affiliation is included in the member profile during registration. There is no limit to the number of affiliations a member may have. The steps performed in executing these functions include opening a shopping group administration window and selecting a group hierarchy from the predefined possibilities or name one and creating a new hierarchy. A potential member list from client affiliation is then opened and names selected to add to the group. For each entry in the hierarchy sequence, member(s) are selected from the membership list. The membership hierarchy is then saved.

In should be noted that in this embodiment, the group hierarchy only defines the authorization sequence through which activity of system 20 should proceed. A member's ability to perform a shopping function is defined during registration, not by the step they are assigned in the procurement process hierarchy. In a preferred embodiment, no checks are made by these functions to confirm a member's ability to perform the step in the sequence to which they are assigned, however, such checks may optionally be made if desired. A member's name may appear only once in a sequence.

Define Group Hierarchy:

If one of the predefined default or optional shopping sequences in FIG. 9 does not match the required workflow, a custom one may be created using this function. A custom configuration is only available to the group that created it, but may be added at a later time to the predefined list available to all groups by present invention management. The sequence of steps required to define a custom hierarchy includes: selecting a predefined sequence to modify or creating a new sequence; placing the Primary Shopping Group Role objects and connecting them to achieve the workflow; and saving the new configuration under a new unique identifier.

Edit Group Membership:

After a group is created and operational, its membership will require maintenance. This function allows an existing group membership list to be revised. Members can be added or deleted. However, before a deletion can be made, the member's name must first be deleted from all occurrences in the shopping group hierarchy using the Edit Group Hierarchy function. If the member belongs to more than one shopping group, only the group being edited is affected. The only way a member can be deleted from all groups without editing each group is to be removed from the registration database. After this edit function is used, the shopping group properties modification date parameter is set as well as the name of the administrator performing the edit.

Edit Group Hierarchy:

As members are added or removed from the shopping group membership list, they need to be added or removed from the shopping hierarchy. Any deletions from the membership list first require removal from the shopping hierarchy. This editing function performs these changes. After this edit function is used, the shopping group properties modification date parameter is set as well as the name of the administrator performing the edit.

Dissolve Group:

When a group is no longer active or required, it may be deleted using this function. After receiving an acknowledgement to dissolve from the administrator, the membership list and shopping hierarchy are purged. After this function is used, the shopping group properties dissolved date parameter is set as well as the name of the administrator performing the action.

Review Groups; Review Activity Status:

Since a client administrator may be responsible for more than one shopping group, they require a function that lets them see their group membership lists and shopping hierarchies. They may also need to see how active any of their groups may be. These functions perform these operations.

In the Review Groups mode, a list of the administrator's shopping groups appears from which anyone can be selected for further examination. Once this is done, a summary of the group's properties is displayed plus a list of the members and their shopping relationships in the group. When the Review Activity Status is selected for this group, a chronological log is provided showing which members accessed which basket on which date and time and what actions they took; which members were added or deleted from a group, by whom and when; whether a member was changed in the shopping sequence, when and by whom; whether a group was dissolved, when, and by whom.

Reporting:

The Assign Group Members, Select Group Hierarchy, Edit Group Membership, Edit Group Hierarchy, Review Groups and Review Activity Status functions offer the ability to save their results to a disk file or to print the results in a convenient output format.

Turning now to FIG. 11, various optional shopping group operations may be provided. After a shopping group member logs in, they can perform functions as indicated by active command buttons on their screen. Functions that members may perform are established at the time of their registration as described separately hereinbelow. The shopping group hierarchy determines the sequence in which screen buttons are activated for each member. As shown, if a member 36 has the ability to create a basket, then a Specify Basket button appears. Since this person also may edit a basket, then an Edit Basket button appears. If, after this member performs these functions, they need to notify their supervisor to approve the basket, then they select the Submit Basket button and the shopping group sequence automatically notifies this supervisor by one of the methods outlined hereinabove. The supervisor 38 may have been registered with review, edit, inquiry, and authorization capability. Therefore, Review Basket, Inquire Basket, Release Basket, Edit Basket and Authorize Basket buttons would appear on their screen, with basket identification, content and pricing. After the supervisor 38 performs their permissible actions and authorizes, the next person in the shopping group sequence is notified. Assuming a second level of authorization is required, two shopping group members 46 may be placed in parallel to perform allowable Approver functions. Whichever member approves first advances the basket. If the next member were a purchasing agent with buying authority 48, then a Submit Order button would be present on their screen with perhaps an Inquire Basket button. When the shipment is received and the items are checked against the order, another shopping group member would have authority to confirm acceptance or receive the ordered items. A Receive Order button would accompany a Review button on this member's screen. Once these actions are completed, the designated shopping group member would see a Basket Close-out button on their screen. As each step in the shopping sequence is performed, the group members at or before each step are informed (notified) of the basket status as discussed hereinabove.

The shopping group hierarchy controls who can perform what functions and when. Therefore, in the scenario described in the paragraph above, if the supervisor logged in before the basket was created, they would not see any buttons or basket properties summary. Neither would subsequent hierarchy members of the shopping group. If the basket were created, but not complete and ready for authorization, the supervisor would see basket summary information and the contents of the basket only in read-only mode (if optional Review Basket authority is provided at registration and the basket security is set to "Ready to share"). Other members would see nothing. Only when the creator of the basket submits it for authorization, would the supervisor see the summary, contents, and command buttons permitted by their profile. Other members would not see the summary, content, and active buttons until each proceeding member performs the key command for their profile, i.e., specify, authorize, order, pay.

Since registrants can become members of shopping groups, they need to supply additional information for their profile as shown in the following Table III.

TABLE III

Registrant Functions and Attributes

| Customer Information Profile | Shipping Address | Primary Role in Shopping Group | Pricing Visibility | Cart Functions Performed |
|---|---|---|---|---|
| Name | Billing | Specifier | Allowed | Create/Specify |
| Title/Role | Acknowledgment | Authorizer | (List | Edit |
| Company | Address | Buyer | and Net) | Review |
| Plant | Etc. | Expediter | List Only | Submit |
| Address | | Receiver | Allowed | Approve |
| Email | | Auditor | Not | Order |
| Phone | | Superuser | Allowed | Pay |
| Numbers | | Administer | | Close-out |
| Industry | | | | Inquire |
| Affiliations | | | | Release |
| Etc. | | | | Deny |
| | | | | Retrieve |
| | | | | Catalog |
| | | | | Copy |
| | | | | Import |
| | | | | Export |
| | | | | Purge |

As shown, an important parameter is "Affiliations", which is used to identify members belonging to shopping groups of more than one company. The default affiliation is the registrant's company name. However, any number of additional affiliations may be entered. As an example, this parameter would allow an account manager or rep salesperson to serve on each of their customers' shopping groups. Selecting a Primary Role in Shopping Group limits the list of shopping group functions available to be performed and facilitates placement in the Shopping Group hierarchy. (Table II above provides a summary list of default and allowable optional functions each shopping group role performs.) When the Shopping Group Functions Performed selections are made, only the optional functions from the Primary Role list (Table II) are available. Another significant registrant attribute is that of "Pricing Visibility". The selection determines whether the registrant always sees list and net pricing for shopping cart contents, only sees list pricing, or does not see any pricing. This attribute will be particularly valuable for Shopping Groups comprised of client and non-client members.

"Create/Specify" serves to create or specify a shopping cart in one of two ways. In the first, items are added to the cart as the designated shopping group member selects (specifies) items to purchase and deposits them in a cart. In the second, the Specify button is used to open a cart definition window, then the specifier proceeds to add items. The system auto-saves contents as they are added to the cart. A cart may also be created or specified with the contents from a catalog, defined later in this section.

"Edit" enables various shopping group members to modify a cart before ordering, once a cart has been created and its contents specified. Editing functions consist of adding and deleting items and modifying quantities.

To add an item, the group member selects the active cart and picks the desired items to add. When complete, they update the cart contents by clicking on the Update button and the new contents are saved with the old.

The process to delete an item is similar. The member selects a cart as the active one, then the content item(s) to be removed. They are asked to confirm the deletion and an Update Cart button is used to finalize the action and save the revised cart contents.

"Modify Quantities" is a separate command dedicated to revising the number of any item in the cart. The active cart is selected and the quantities changed. When satisfied, the Update button saves the new information in the cart.

During the initial create/specify process, Edit functions are active to permit quick changes.

"Review" anticipates that some Shopping Group members will need only read-only or viewing capability of the cart contents. When this functionality is specified, all group members with this access will see the cart identification and its contents, provided the cart security is set to "Ready to share" by the cart originator.

"Submit" serves to advance the cart to the next member in the authorization hierarchy once a specifier has created a cart with all desired contents. When an Inquire message or a Deny message is created, this command is used to send the message.

"Approve" may be used by one or more individuals to indicate approval and advance the cart though the procurement cycle once the cart is submitted by the creator/specifier. The level of approval is determined by the order in which the member appears in the Shopping Group hierarchy, as discussed hereinabove.

When a group member can "Order", they have the ability to issue P.O.s and to buy shopping cart contents on behalf of their company. The Submit Order button is their stamp of approval to advance the cart accordingly.

After the goods ordered have been delivered, the responsible Shopping Group member confirms the items are those ordered. When confirmed, they select the "Receive" button.

Once an order has been received item-for-item against the original cart contents, an authorization is issued by a Shopping Group member to "Pay" the invoice. Since the invoice resides in the client's ERP or purchasing system, this step generally only provides advice since system 20 may not be able to make the transfer of funds occur from the client system.

When payment has been matched to the invoice and executed, a command can be issued to "Close-out" the cart. The cart then takes on a Dormant activity state as explained in the next section, Shopping Cart Functions and Attributes.

When the contents of a cart raise a question by a Shopping Group member, the member may "Inquire" by entering a brief message in the space provided. This inquiry puts the cart in the Suspend activity state as described hereinbelow, and forwards it, when Submit(ted), to previous members in the hierarchy for a response. These members receive an Inquire notice with the cart and are given an opportunity to Respond with a edited cart and/or a message in the window provided. When the inquiry originator receives the response, they issue a Release command, which returns the cart to the Normal activity state as explained in the next section and the procurement cycle may proceed. They may have iterative inquiries until their issues or questions are clarified. They may escalate Inquire to Deny if they are not satisfied with the responses. If the members do not respond in a timely fashion, the cart may expire based on persistence rules discussed in the next section.

If a group member so authorized objects to individual cart items or to the entire cart, they may "Deny" the cart. The member can provide an explanation and/or request a response in a window provided. This action leaves the cart suspended. Submit is used to issue the denial and messages to previous members in the hierarchy. These members may respond as in the Inquire definition and the member can Release the cart if satisfied. If the denial objection is not overcome, the cart state becomes dormant based on the rules established by the cart persistence parameter explained in the next section.

If a cart is in the dormant state, such as after a close-out or deny situation, its contents may be reclaimed for use in a new cart by using the Retrieve function. Cart identification must be provided to resurrect the contents.

For repetitive shopping situations, it may be desirable to capture the contents in a list for reuse in another cart during the create/specify process, using the "Catalog" function. The catalog may be named with up to a 40-character, or larger, descriptor. A list of catalog names is present to the Shopping Group members with Create/Specify privileges. One or more catalogs may be selected to pre-load the cart. If an item is no longer valid (discontinued or obsolete), it triggers an error message and may be deleted.

After a member creates and specifies a cart, they may want to duplicate its contents, then save it under a new identity for further editing. The Copy function accomplishes this task.

Occasionally, a shopping group may need to use a cart from another source and the Import function enable this transaction.

Similarly, a shopping group may want to share one of their carts with another group or organization. This is accomplished by using the Export function.

To remove a cart entirely from the present invention database, the Purge function may be used. A confirmation to Purge or Cancel is always issued.

Additional, more detailed embodiments of the Shopping Cart/Basket Functions and Attributes discussed hereinabove will now be discussed. As mentioned above, in a preferred embodiment, it is possible for each owner to have multiple baskets. To facilitate this, a relatively rigorous basket identification system may be used and additional basket functions are generally needed. Also, the cart takes on activity and shopping states based on actions being performed on it by the shopping group. Cart persistence may be selectable to match a wide range of business situations in the procurement cycle. A cart security attribute determines whether cart contents are ready to be shared with all shopping group members. These aspects include those listed in the following Table IV.

TABLE IV

Shopping Cart Functions and Attributes

| Cart Functions Performed | Cart Identifier | Cart States | Shopping States | Cart Persistence | Cart Security |
|---|---|---|---|---|---|
| Create | Name | Normal | Empty | One week | Ready to share |
| Edit | Owner | Suspend | Submitted | Two Weeks | Do not share |
| Reveiew | Number | Dormant | Approved | One Month | |
| Duplicate | | | Ordered | Two Months | |
| Archive/ | | | Released | Three Months | |
| close-out | | | Hold | One year | |
| | | | Denied | Specify Days | |

When a specifier creates a cart, this person automatically becomes the cart owner, a unique number is assigned to the cart by the system, and the customer number is associated with the cart. The specifier can use up to 40 alphanumeric characters, or more, to describe the cart.

The cart assumes activity states that depend on the shopping group functions being performed.

The Dormant state is achieved by either denying a cart or by closing out a cart. The cart with its identification and contents is in the database, but is unavailable for processing. It can be resurrected using the Retrieve function as described in the previous section on Registrant Functions and Attributes.

The Suspend state is reached by using the Inquire or Deny function. While suspended, the cart's contents are read-only for all members except those responsible to respond who retain edit capability. No approval or buying functions are active. The Release command removes the cart from the Suspend state.

The Normal activity state defines the condition under which all other cart business is conducted.

In addition to activity states, the shopping cart assumes shopping states corresponding to the completion of a registrant procurement function.

Empty: after cart is created, but before adding any items to it.
Created: when any contents have been added to a cart.
Submitted: after specifying cart contents and forwarding for approval.
Approved: after each authorization of the cart.
Ordered: after a buyer acts upon the cart.
Received: when the ordered items are checked against receipt and accepted after shipment.
Expedited: a shopping group member improved the delivery.
Hold: an inquiry has been issued.
Denied: a shopping group member rejected a cart.

For audit trail reasons, shopping states accumulate the name of the individuals that activated each shopping state and the date of their actions. Additionally, the cart may carry content information, such as part numbers, model codes, descriptions, etc., and financial information (i.e., pricing information) throughout the processing thereof. Pricing information preferably may be changed at any time, to facilitate adjustment due to a variety of factors, including fluctuations in market conditions and/or contractual arrangements.

Since each shopping group faces different procurement cycles, the cart provides a selectable Persistence parameter to determine how long it will be available. The persistence preferably cannot be changed after the cart is created. At the end of this period (two weeks, one month, two months, three months, or adjustable calendar days (i.e., 2 minimum, 999 maximum)), a cart, its identification, and contents expire and are purged from the database in the event the cart is empty or created, but not submitted. If submitted or approved, then the Shopping Group is warned, i.e., twice, five and two business days before expiration, so they may take corrective action. If the approval and ordering is not accelerated by the deadline, then the cart expires or becomes Dormant. After a cart is ordered, the persistence period no longer affects the cart.

A Cart Security feature allows the creator/specifier to block access to cart contents until they are ready for viewing and processing by group members. "Do not share" allows only the cart owner to see and operate on the cart. All registrant functions become operational when the cart owner changes the security to "Ready to share". The default setting is "Ready to share". In this embodiment, the Specifier would not be able to Submit a cart without such readiness.

As discussed hereinabove, a Shopping Group is a set of registered users of the present invention who may share baskets between themselves. More detailed embodiments of shopping groups of the present invention will now be discussed. A Shopping Group may be created by any user. Every user is preferably in a one-member Shopping Group by default, as soon as they are registered with the site and approved to shop. If a user wanted to be able to share baskets with other users, then he or she would create a Shopping Group with additional members. This is a relatively simple process. A link may be provided that would prompt the user with a Name, Description, and Password for the Shopping Group. The Name and Password come into use when inviting other users to join the group.

After a group is created, the creator would email other people and "invite" them to join the group. This may be done from a screen where users may manage their own groups. In addition to renaming, changing passwords, and viewing members, there would be an Invite button here. This would generate an email including the Group Name and Password, with a hyperlink back to the website of the present invention. Once the recipient receives the email, they may attempt to join the group at the website. If these invitees were not previously registered, then they would have to register. The creator of the group acts in an Administrative role for the group. This Administrator may perform membership invitations and deletions. All members may perform most actions on baskets they can access. Only the owner of the basket has the ability to effect administrative changes, such as altering the password.

As discussed hereinabove, a shopper may be in many different Shopping Groups. When logging onto the website of the present invention, the user may be placed in the last group into which the user was entered. If the user belongs to multiple groups, there would be a link on a main page for the user to switch groups. There would also be a link to the properties of the current group. Properties would include owners name, date formed, description, list of current members, etc.

Group Passwords/Names/Internal Identifiers

The owner of the group may change the name and password at anytime. Users only need to know the name and password at time of gaining membership to the group. If a member of a group chooses to leave a group, then that user will need the name and password to gain membership again. This name and password may or may not be the same as their previous membership, because the group owner may have changed either. The internal identifier of the group links the user to his group memberships. If the name changes, the user will see the change almost instantly. Examples of the some of the actions available to the owner (administrator) and other members are shown in the following Tables V and VI.

TABLE V

Group roles and membership actions

|  | Invite | Expel |
|---|---|---|
| Owner | YES | YES |
| Member | NO | NO |

TABLE VI

Group roles and administration action permissions

|  | Group Message | Dissolve Group | Leave Group | Change Group Name | Change Group Password |
|---|---|---|---|---|---|
| Owner | YES | YES | NO | YES | YES |
| Member | YES | NO | YES | NO | NO |

Referring now to the basket/cart in particular, the name of the cart is preferably auto-generated by present invention, while providing the creator with the ability to change it. This way, if the user wanted to allow other Group members to add to the basket, he could provide the password, if any, to the other users.

For example, User A creates a basket. This basket inherits all pricing controls of User A. When User A created the basket, it stores the Group ID the user was in at time of creation. All members of the group may see this new basket. If the basket has a password applied, then any user in the group would need to know this password in order to perform any action on it. This would include adding products, removing products, deleting the basket, copying the basket, checking out, etc. So, if User A wanted to enable User B to add products, User A could notify User B through an interface on the website of the system 20. This may be done with an email generated with a hyperlink to the basket, and the name and password for future reference. In this manner, the basket is "forwarded" to others.

If the password is left blank on a basket, then it is essentially a public basket, and any user in the group is allowed to act upon it. The basket would retain all pricing properties of the creator, unless ownership of the basket is transferred to another user. Such a transfer would be done with the use of the password.

Basket Passwords/Names/Internal Identifiers

When a user switches to a basket, the user sees the Name of the basket. The Internal Identifier is stored as part of the user's record, along with the supplied password for the basket. When a user tries to access that basket via add item, view basket, modify item, copy item to, copy item from, etc., system 20 checks to see if the saved password matches the baskets password, if it is a match, the action is permitted. If they do not match we check to see if this user owns the basket, if so, the action is permitted. If the user is not the owner, system 20 asks the user for a password. The password may be saved in the user's record so that subsequent actions may be allowed without asking for the password. The password is preferably saved only for the current basket, so that switching from basket to basket will clear this field. All baskets without passwords may be accessed without prompting the user. The owner of the basket may change the name of the basket at any time. However, the internal identifier of the basket is stored by system 20 with the customer record so that the user will not lose the basket.

The owner may change the password of the basket, if other members do not know the password, they will not be able to add, modify, view, checkout, copy from or copy to that basket.

Setting the re-price flag on a basket is the first step to re-pricing. The basket gets re-priced the first time any user tries to view a basket that has the re-price flag set. The act of re-pricing causes all items in the basket to be deleted and reinserted, applying all of the pricing logic. If a model no longer exists in the model data, then that model will be deleted and not re-inserted, since a model that does not exist cannot be priced. This feature will advantageously help insure that there is not an item in the basket that has an invalid price. The system 20 may be stopped and restarted after a full re-price has been applied to all baskets to help ensure that no user tries to checkout a basket that has the re-price flag set.

Order Retrieval will now be discussed. In the event a user had previously created an order, then that order may be used as a template for a new basket. On the pertinent page of the website of system 20, the user may have to type in a branch office order number of the order to retrieve it. A list of Order Numbers may also be displayed to the user to select from. Once an order is selected to be recalled, then a new basket is created by system 20, inheriting the pricing controls of the current user. The user may also be permitted to add (i.e., copy/paste) the items of a preexisting order to an existing basket.

Exemplary roles and action permissions for various scenarios are set forth in the following Tables VII–XII.

TABLE VII

Basket roles and shopping action permissions on basket without inquiry set (i.e., without an Inquiry Flag)

|  | Add Item | Delete Item | Modify Item | Pricing Control | Check Out |
|---|---|---|---|---|---|
| Owner | YES | YES | YES | YES | YES |
| Non-Owner | YES | YES | YES | NO | YES |

TABLE VIII

Basket roles and shopping action permissions on basket with an inquiry set (i.e., with an Inquiry Flag)

|  | Add Item | Delete Item | Modify Item | Pricing Control | Check Out |
|---|---|---|---|---|---|
| Owner | NO | NO | NO | NO | NO |
| Inquirer | NO | NO | NO | NO | NO |
| All Others | NO | NO | NO | NO | NO |

TABLE IX

Basket roles and administration action permissions on basket without an inquiry set (i.e., without an Inquiry Flag)

|  | Copy Basket Items | Rename Basket | Forward Basket | Change Password | Delete Basket |
|---|---|---|---|---|---|
| Owner | YES | YES | YES | YES | YES |
| Non-Owner | YES | NO | NO | NO | NO |

TABLE X

Basket roles and administration action permissions on basket with an inquiry set (with an Inquiry Flag)

|  | Copy Basket Items | Rename Basket | Forward Basket | Change Password | Delete Basket |
|---|---|---|---|---|---|
| Owner | YES | YES | NO | NO | YES |
| Inquirer | YES | NO | NO | NO | NO |
| All Others | YES | NO | NO | NO | NO |

TABLE XI

Basket states and action permissions on basket without an inquiry set (without an Inquiry Flag)

|  | Set Inquiry | Take Control |
|---|---|---|
| Owner | YES | NO |
| Non-Owner | YES | NO |

TABLE XII

Basket states and action permissions on basket with an inquiry set (with an Inquiry Flag)

|  | Release Inquiry | Take Control |
|---|---|---|
| Owner | YES | NO |
| Inquirer | YES | NO (inquirer must be the owner) |
| All Others | NO | YES (includes members of other groups) |

TABLE XII

Set Re-Price Flag based on user actions

|  | Modifies Currency | Modifies NPA | Edit Landed Cost Set | Edit Order Entry Company | All Other Actions |
|---|---|---|---|---|---|
| Owner | YES | YES | YES | NO | NO |
| Non-Owner | NO | NO | NO | NO | NO |

TABLE XIII

Set Re-Price Flag based on site manager functions

| | Model Data Upgrade | Currency Conversion Upgrade | NPA Upgrade |
|---|---|---|---|
| All Baskets | YES | YES | YES |

Exemplary actions included in a preferred embodiment of the present invention are set forth in the following Table XIV.

TABLE XIV

| | Actions Described |
|---|---|
| Add Item | Add a model/part to the current shopping basket. |
| Change Basket Password | This changes the standard password of the basket. This password secures all items of a basket from all members of the group that do not know the password. The owner of the group can change the password at anytime. |
| Change Group Password | This password is only used to verify people when they enter the group. After they are given membership, they will not need to know the password of the group, they will never be asked again, unless the leave the group, and try to come back or they are expelled from the group and try to get back |
| Check Out | Turn the basket into an order, defaulting the checkout info with the info from the owner (i.e., SAP ™ Partner Data). If the person clicking the checkout button has permission to see the line item discounting, then that person will able to modify the branch office code (i.e., for sales tracking) of the order at that time. |
| Copy Basket Items | Copy the item(s) of a basket, taking only the model codes, tag information to be affixed to the items (if any), and quantities of the items. Insert the items into the destination basket based on the add item functionality and rules. Copy will not take line item discounts. |
| Delete Basket | The owner of the basket may choose to delete it at any time. This causes all items to be deleted, no reference of the basket will be found in the website. |
| Delete Item | Delete a line item from the basket, regardless of who added it |
| Dissolve Group | All orders stay in tact, all baskets within the group get deleted. Users that were formally in the group will no longer be able to shop within the group context. The group will not show up in the users list of available groups. A final email may be sent to all members stating that the group was dissolved. A text box for this purpose may be provided on the website to enable input of an explanation of why the group has been dissolved. |
| Expel | Expel a user from the group. This user is no longer able to shop in that group context. The user may get back in if he has the password, so the password must be changed to keep the expelled member out. Members of a group only need the password when getting back in, they do not need the group password until they leave the group or are expelled. |
| Forward Basket | The owner may decide to forward a basket to any valid email address (i.e., of a registered user) on the site. There is preferably no pick list of emails, no searching, rather, the user must know the email address he is forwarding to. At time of forwarding the recipient (new owner) is notified by email and by a notice on the homepage of their account that a forwarded basket is available to pick-up. When the recipient takes control, the basket gets its group ID and pricing controls re-assigned. The original owner, who still has a copy of the forwarded basket, may optionally request email notification that the forwarded basket was retrieved. Alternatively, both the sender and recipient may view basket forwarding status in a log devoted to this purpose in their account. |
| Group Message | Send an email to all members in the group. |
| Invite | Invite other present invention users into the group. It is basically an email to the user with the group name and the group password |
| Leave Group | You can leave a group anytime, you need the group name and password to get back in. |
| Modify Item Pricing Control | Edit the tags, quantities, configuration and Aux Specs of an existing line item in a basket, regardless of who added it. Changing the NPA, Currency CD, line item discounting. |
| Release Inquiry | Let the group members shop again. No one may take control of a basket until the inquiry is released. |
| Rename Basket | The name of the basket should be unique within the shopping group so as to avoid confusion when viewing the list of baskets. Users will not need to see the Internal Identifier as long as the name of the basket is unique within he group. Only the owner can change the name, changing the name should not affect other members of the group, their shopping experience should not be interrupted. The name of the basket will display while viewing the basket, it will be refreshed every time the user refreshes the page. |

TABLE XIV-continued

Actions Described

| | |
|---|---|
| Rename Group | The owner of the group can change the name anytime he wishes. This may confuse them if they do not know about the name change in advance, but it will not disrupt their current shopping experience |
| Set Inquiry | This flag stops most actions on the basket. When a user might need to do a little research and does not want anyone making changes for a little while, he sets the flag. When he has resolved the issues, he releases the inquiry; users can get back to using the basket. |
| Basket Ownership | Any user may take control of any basket, provided they know the group name (and group password) to which the basket belongs, and the basket password. This will cause the group id in the basket to be reset, the inquiry released, and the basket re-price flag will be set. The person who took control is now the owner; the group the basket belongs to is the group that the new user was operating in at the time he took control. |

The following are examples of single and multiple member group use of the present invention.

EXAMPLE 1

One Shopper Acting Alone to Shop

Scenario—User Melissa uses system 20 to shop for herself. She doesn't want to belong in any Shopping Groups, or have her baskets available to others. She belongs in the default Shopping Group she was placed in after registering. She can create multiple baskets, however.

Here, Melissa can see all three baskets, because she created all three. She may put a password on them when creating them, but it is not necessary, because baskets are only accessible to members of the same shopping group who have the proper password.

Since there are no other shoppers in her Shopping Group, no one else may perform any actions on these baskets. No one else can see the baskets through any function in the present invention.

If she sends an email to another user, inviting them into the Shopping Group, then the baskets would be visible to this new shopper. That invited user must join the group by supplying the group name and password. After that user has joined the group, they no longer need to know the password, and the group name will be visible with all of the other groups they have joined. This user will then be able to switch from group to group. Within each group, the user will be able to switch between baskets.

EXAMPLE 2

Multiple Shoppers in a Shopping Group

Scenario—Three users are in a Shopping Group. Ted created the group, and invited Mary and Jose to join. They both registered with the present invention and joined Ted's group. Ted had already created two baskets (Baskets A+B), with passwords. Mary has also created a basket (Basket C), but she left the password blank. Now, Ted can act on all three baskets, because he knows the passwords for his original 2 baskets (more importantly, he owns the basket), and Mary's basket has no password, so he can access it. Jose and Mary can only use Mary's basket—Basket C.

If Ted wanted Jose to work on Basket A, he would use system 20 to Notify him. In a Group Actions page, he could see a list of all group members. Then, he would click on Jose's name to send him an email, notifying him that he should review this basket, and add any items he needs. In the email, there would be a reference to the basket name, the basket password, (and the group name and password). When Jose logs in, he joins the group and navigates to the basket, with the basket password.

As an additional optional feature of the present invention, system 20 may include a search engine to facilitate lookup of items for placement into a cart. The search field label may include "model code" and "model description". These fields may be nominally identical to conventional "part number" and "part name" labels, but guide the user to select what they want without assuming that the part number necessarily equates to model number. These labels may appear in a drop down list that is labeled "Search by." Once a choice is made, it preferably becomes the default for the search session until changed.

The descriptions used for parts and models are preferably sufficiently broad to facilitate improved search results. Synonyms and/or equivalent features may also be included in these descriptions (i.e., fields) as an aid to searching in unfamiliar territory. For example, if the visitor entered CP 30 the search may recommend Control Processor 30 or if the user entered Remote Workstation the search may suggest Mobile Workstation or simply list all the workstation types for the user to choose from. Well-known collaborative filtering technology, (see, for example, the GroupLens™ Research Project in the Department of Computer Science and Engineering at the University of Minnesota, http://www.cs.umn.edu/Research/GroupLens) may also be used to facilitate this.

A feedback mechanism may be added to the search function that asks the visitor whether they found what they were looking for and gives them an opportunity to send a brief message about what they tried to do if things did not succeed.

The Search function may also include a mechanism for showing only Express delivery items as part of the criteria for looking for a model.

Also, there is preferably a provision for enabling a user to re-sort the search results in reverse order or to re-sort based upon another field. Furthermore, the output of the search is displayed as some user-selectable number of items per page based on the size and resolution of screen or user's desire to scroll rather than go to another page. Also, the system may permit a user to preview the contents of a page without actually going (i.e., hyperlinking) to the page. The results may also be indexed alphanumerically on part number/model code or part name/model description and then offer "Jump To" links based on the index generated. For example, a search returns 170 items which equates to 17 screen pages. The user has no way of knowing whether the results have 2 or 5 pages containing their particular item of interest within the 17 total pages and where these pages are in the range. The system 20 may significantly narrow the manual searching (and time) by indexing the 17 pages and building Jump To fields. For example, if a user were to select part name/model description, the results may show: Aa to Az on pages 1 through 3, Ba through Mz on pages 4 through 5, Na through No on pages 6 through 12, Np through Tz on pages 13 through 15, and Ua though Zz on pages 16 through 17. In this sample scenario, Aa to Az represent all names/descriptions that Start with A followed by "a" continuing to those that Start with A followed by "z." The indexing algorithm derives these labels, then inserts the appropriate screen page numbers associated with the labels.

Figure 12:
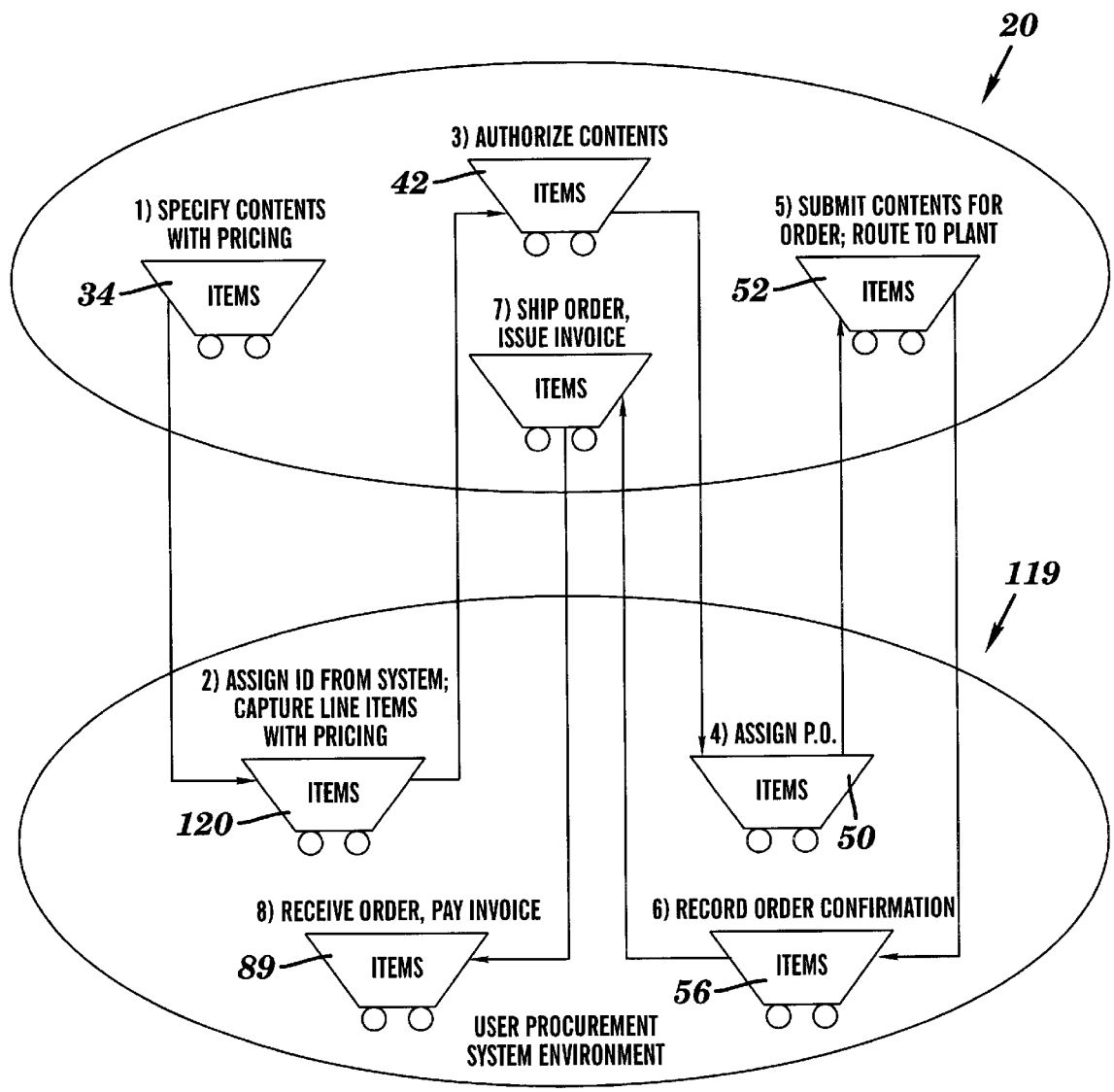
FIG. 12 is a functional block diagram, at a high level, of an embodiment of the present invention interfacing with a user's procurement system environment.

As mentioned hereinabove with respect to FIG. 1, additional optional functionality of the present invention includes interfacing with an Enterprise Resource Planning (ERP) system, including sending the order 54 to a conventional ERP router 62 which is communicably coupled to an Order Entry component 64, ERP status window 68, and/or manufacturing facility 66 of the client company. Referring now to FIG. 12, the shopping basket 22, 22$_1$, 22$_2$, etc. may be electronically integrated with a customer's system 119. In this regard, customers (users) typically need to initiate requests to purchase (RTP) or requests to quote (RFQ) using an existing maintenance, procurement, or financial system (i.e., ERP system) in their facility. This process is generally electronic. A lack of integration between customer systems and conventional websites during these steps disadvantageously represents a barrier to increased e-commerce business.

Since a shopping basket is treated as an object in system 20, it may have financial and procurement attributes appended to it, which would allow the basket to "transparently migrate" from the user's system 119 to system 20 during different phases of the customer's procurement process. This may be accomplished by registering a customer's ERP system or a module(s) thereof as a member (i.e., a second level approver 46 and/or buyer 48) of a shopping group. In a fully automatic mode, instead of a person providing the contents to the basket, the ERP module would login to system 20 and fill the appropriate basket and submit it as an order as described hereinabove. Alternatively, in a manual mode, an employee of the customer would login and then import the required items from a Plant Maintenance (PM) module of the ERP system, into the baskets. As the basket progresses from initial specifications and authorizations supplied in system 20, pricing, configuration, and product details are provided to the customer's system for final approvals and buying authorization, returning to iastore.com for routing to the appropriate manufacturing facility, and finally to the customer for receiving, invoicing, and payment as discussed hereinabove. The shopping basket acquires customer and system 20 information as it passes between systems and shares this information as it does so. Therefore system 20 and customer systems are nominally always up to date with the latest purchasing information. There is no need to manually replicate this information.

Referring now to FIG. 12 in greater detail, a shopping basket 22, etc., moves between system 20 and customer system 119 (i.e., which includes system 20 members 46 (PO issuer) and/or 48 (buyer)) to acquire the necessary information to proceed. As shown, the cart 22 is created 34 by system 20, passed to customer system 119 where an ID is assigned 120 and item and pricing information are captured. The cart is then authorized 42 and then assigned 50 a PO. The order is submitted 52 and then confirmed 56. Subsequent steps include sending the order back to system 20 for shipping and invoice generation, followed by receiving and verifying 89 the order and paying the invoice at system 119.

As mentioned hereinabove, the present invention advantageously provides an efficient and streamlined means for a salesperson, account manager, or other interested party to remain in the purchasing loop. This aspect is now discussed in greater detail with reference to FIGS. 13–17.

Figure 13:
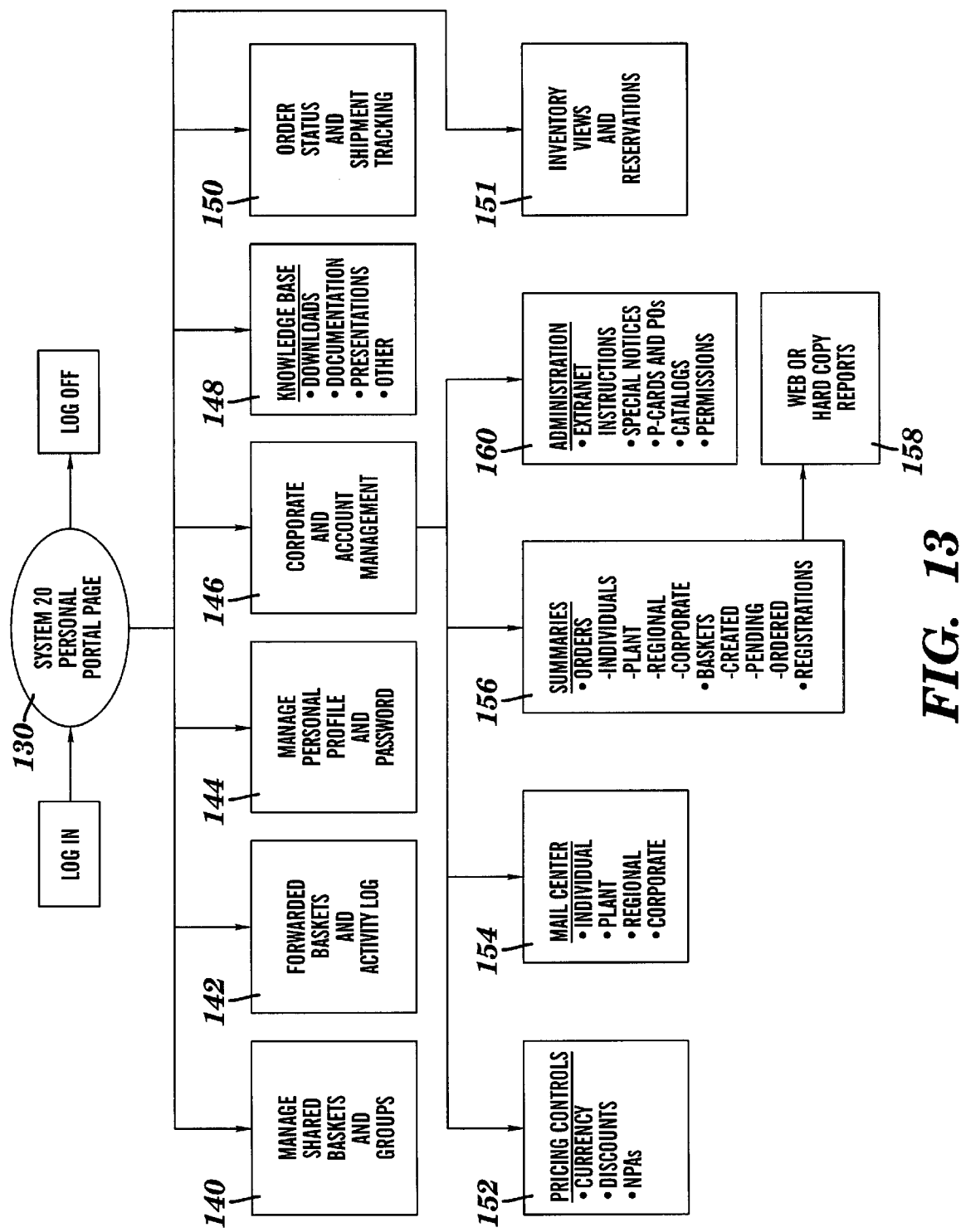
FIG. 13 is a functional block diagram at a high level of a further aspect of the present invention.

Turning to FIG. 13, in a still further optional aspect of the present invention, system 20 may include a portal page (screen) 130 which is customizable by a member of a shopping group 78, 78$_1$, 78$_2$, . . . 78$_n$, to view and/or manipulate various predetermined user-selectable features of system 20. Members such as account managers, representative/distributor companies, branch office management, associate company operations management, alliance customer corporate and plant purchasing personnel, and others, may customize a portal page 130 to keep them informed about system 20 activity. The portal page 130 thus provides a standardized, yet customized, display for various internal and external users thus keeping them in the information loop.

The various functions offered in portal page 130 are user-selectable to the extent they are commensurate with the responsibility of the individual or organization for which the portal 130 was created. As shown, exemplary options that may or may not be available to a particular individual or organization based on their responsibilities may include Manage Shared Baskets and Groups 140, view Forwarded Baskets and Activity Log 142, Manage Personal Profile & Password 144, Corporate and Account Management 146, Knowledge Base 148 (including downloads, documentation, Presentations, etc.), Order Status and Shipment Tracking 150, and Inventory Views and Reservations 151. Drilling down from the Corporate and Account Management screen 146 provides additional options, including Pricing Controls 152 (including Currency/Aging, Discounts and NPAs), Mail Center 154 (i.e., Individual, Plant, Regional, and Corporate), Summaries 156 (including Orders, Baskets, and Registrations) with options to generate electronic or hard copy reports 158, and Administration 160 (such as Extranet Instructions, special notices, P-cards and POs, Catalogs, and Permissions).

Turning to FIG. 14, an example of a typical portal 130$_1$ for an Account Manager includes blocks 140, 142, 144, and 146. Additional options available upon drilling down from the Corporate and Account Management screen 146 include selected functionality of blocks 152, 154, 156, and further include the ability to Review Customer Feedback Messages 162.

As shown in FIG. 15, an example of a typical Alliance Partner Corporate Level portal 130$_2$ includes blocks 140, 142, 144, and 146 (indicating Corporate User). Additional options available upon drilling down from the Corporate and Account Management screen 146 include selected functionality of blocks 152, 154, 156, and 160.

Figure 16:
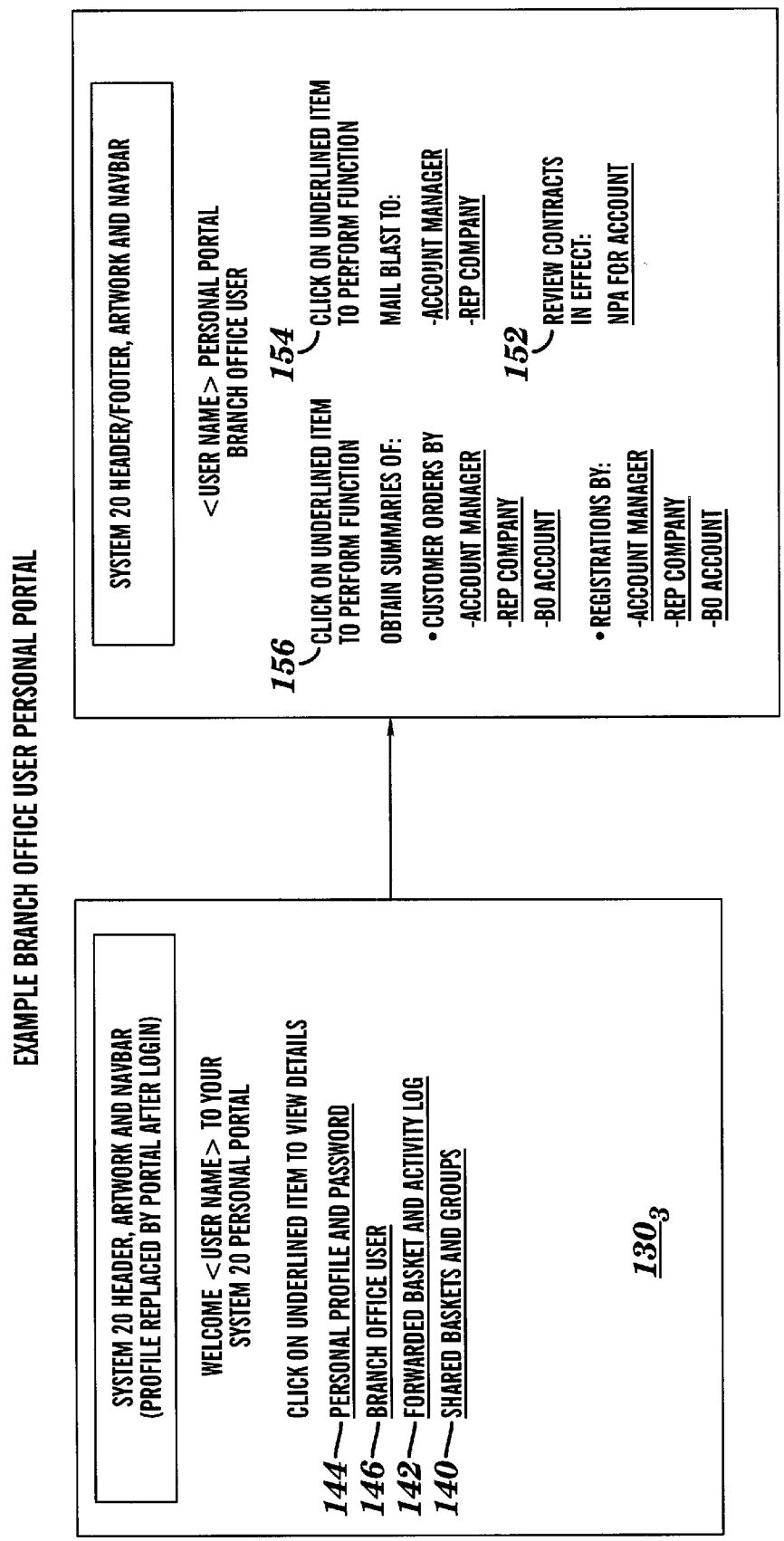

Turning now to FIG. 16, an example of a typical Branch Office User portal 130$_3$ includes blocks 140, 142, 144, and 146 (indicating Branch Office User). Additional options available upon drilling down from the Corporate and Account Management screen 146 include selected functionality of blocks 152, 154, and 156.

Turning to FIG. 17, an example of a typical Manufacturer's Representative portal 130$_4$ includes blocks 140, 142, 144, and 146 (indicating Rep User). Additional options available upon drilling down from the Corporate and Account Management screen 146 include selected functionality of blocks 152, 154, and 156.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A computer implemented method in an interactive medium for conducting commerce, said method comprising the steps of:

(a) providing a website, the website adapted for electronic communication with a plurality of users;

(b) providing on the website an electronic shopping basket being selectively actuatable into a plurality of states;

(c) enabling at least two of the plurality of users to access the shopping basket when the shopping basket is disposed in either of at least two of the states;

(d) assigning to each of the users at least one of a plurality of hierarchically distinct abilities to affect the state of the shopping basket;

(e) wherein the users are permitted to view the status of the shopping basket and affect the state of the shopping basket to collectively select and approve items for purchase.

2. The method of claim 1, wherein the at least two of the plurality of users comprises two users and the at least two of the states comprises two states.

3. The method of claim 1, wherein the at least two of the plurality of users comprises all of the users and the at least two of the states comprises all of the states.

4. The method of claim 1, wherein the plurality of states provide selected levels of access to the users.

5. The method of claim 1, further comprising the step of automatically notifying each of the users of any change of state of the basket.

6. The method of claim 5, wherein said step of automatically notifying the plurality of users comprises affecting a display of the shopping basket on the website.

7. The method of claim 5, further comprising means for said automatically notifying step, selected from the group consisting of: automatically e-mailing the users; automatically affecting a display of the shopping basket on the website; and manually e-mailing the users.

8. The method of claim 1, wherein the users comprise members of a shopping group.

9. The method of claim 6, further comprising a plurality of shopping groups.

10. The method of claim 9, wherein at least one of said users are members of the plurality of shopping groups.

11. The method of claim 8, wherein the members are disposable at a plurality of discrete locations.

12. The method of claim 11, wherein said members are disposed within and without a purchasing company.

13. The method of claim 1, further comprising the step of integrally coupling financial data associated with the items to the basket.

14. The method of claim 1, further comprising the step of providing two-way communication between users integrally with changes of state of the basket.

15. The method of claim 14, wherein the two-way communication comprises transmitting an inquiry simultaneously with placing the basket into a suspend state.

16. The method of claim 14, wherein the two-way communication comprises one user notifying an other user of a change of state and the other user confirming an other change of state to the one user.

17. The method of claim 16, wherein the two-way communication comprises one user notifying an other user the basket is ready for approval, and the other user confirming approval of the basket to the one user.

18. The method of claim 1, wherein the plurality of hierarchically distinct abilities to affect the state of the basket comprise the ability to place items into the basket, to place the basket into an suspend state, to place the basket into a denial state, to place the basket into an approval state, and to effect no changes of state.

19. The method of claim 18, wherein the users comprise hierarchical users having hierarchically arranged abilities to affect the state of the shopping basket.

20. The method of claim 19, wherein the hierarchical users comprise a specifier, and an approver.

21. The method of claim 20, wherein the hierarchical users comprise a first level approver and a second level approver.

22. The method of claim 20, wherein the hierarchical users further comprise a buyer and a receiver.

23. The method of claim 19, further comprising the step of sequentially permitting hierarchically adjacent ones of the hierarchical users to communicate bi-directionally with one another prior to interaction with others of the hierarchical users.

24. The method of claim 1, wherein said providing step (b) and said enabling step (c) further comprise providing a plurality of the shopping baskets which are accessible by the plurality of users.

25. The method of claim 1, wherein the access comprises viewing the contents and viewing the state of the shopping basket.

26. The method of claim 1, further comprising the step of permitting a user to copy baskets, name baskets, and recall baskets.

27. The method of claim 20, wherein a transaction is consummated upon authorization by the approver.

28. The method of claim 8, wherein users are invited to join the group by an e-mail message.

29. The method of claim 18, wherein ownership of the cart is selectively transferable to another member of the group.

30. The method of claim 8; wherein membership of said group is editable.

31. The method of claim 30, wherein members of the group include representatives of both a selling entity and a purchasing entity.

32. The method of claim 8, further comprising selective pricing rules, wherein members are selectively permitted to view both list and net prices, list prices, or no pricing.

33. The method of claim 1, wherein the shopping cart is selectively disposable in dormant, suspend, or normal states.

34. The method of claim 33, wherein in said dormant state, identification and contents of said cart are viewable, while said cart is unavailable for subsequent processing.

35. The method of claim 33, wherein in said suspend state, said cart is unavailable for approval or buying functions.

36. The method of claim 1, wherein said cart comprises a selectable persistence function serving to purge the cart upon expiration of a pre-selected time period.

37. The method of claim 1, further comprising a selectable security function to nominally prevent individual ones of the members from accessing the cart.

38. The method of claim 1, further comprising a re-price function wherein all items in the cart are re-priced when a user subsequently attempts to view the cart.

39. The method of claim 1, further comprising the steps of:

(f) opening a shopping group administration window;

(g) creating a group hierarchy;

(h) opening a list of predetermined names; and (i) for each entry in the group hierarchy, selecting a member from the list.

40. The method of claim 39, wherein the list of predetermined names includes an affiliation parameter identifying the individual's relationship to a purchasing company.

41. The method of claim 40, wherein the affiliation parameter is selected from the group consisting of: customer company employee, selling entity employee, agent of customer company, and agent of selling entity.

42. The method of claim 39, wherein said creating step (g) comprises selecting the group hierarchy from a list of predetermined group hierarchies.

43. The method of claim 42, wherein said creating step (g) further comprises creating a custom group hierarchy by the steps of:
  (j) modifying the group hierarchy to create a desired sequence of levels; and
  (k) assigning role objects to each level.

44. The method of claim 1, further comprising the step of providing a search engine to look up items for placement into the shopping cart.

45. The method of claim 44, wherein the search engine includes a name search field and description search field.

46. The method of claim 44, further comprising the step of indexing results generated by the search engine.

47. The method of claim 1, further comprising the step of interfacing the website with an Enterprise Resource Planning (ERP) system, by generating an order for the approved items and sending the order to the ERP system.

48. The method of claim 47, wherein the interfacing step comprises sending the order to an ERP router which is communicably coupled to an Order Entry component of the ERP system.

49. A computer implemented method in an interactive medium for conducting commerce, said method comprising the steps of:
  (a) providing a website, the website adapted for electronic communication with a plurality of users;
  (b) providing on the website an electronic shopping basket being selectively actuatable into a plurality of states, the states providing selected levels of access to the users;
  (c) enabling the plurality of users to access the shopping basket when the shopping basket is disposed in any of the states;
  (d) assigning each user to a shopping group, wherein each member of the shopping group has at least one of a plurality of hierarchically distinct abilities to affect the state of the shopping basket;
  (e) enabling the users to become members of a plurality of shopping groups;
  (f) enabling each shopping group to have a plurality of shopping baskets;
  (g) automatically notifying each of the members of a shopping group of any change of state of a basket;
  (h) providing a selectable persistence function to purge the cart upon expiration of a pre-selected time period;
  (i) providing a selectable security function to nominally prevent individual ones of the members from accessing the cart;
  (j) providing a search engine to look up items for placement into the shopping cart;
  (k) wherein the members of a shopping group are permitted to simultaneously view the status of the shopping basket and sequentially affect the state of the shopping basket to collectively select and approve items for purchase; and
  (l) interfacing the website with an Enterprise Resource Planning (ERP) system, by generating an order for the approved items and sending the order to the ERP system.

50. A computer system in an interactive medium for conducting commerce, said computer system comprising:
  a website adapted for electronic communication with a plurality of users;
  an electronic shopping basket disposed on the website, the shopping basket being selectively actuatable into a plurality of states, and being accessible by a plurality of users when the shopping basket is disposed in any of the states; and
  a hierarchy table coupled to the shopping basket, wherein the state of the shopping basket is selectively affectable according to hierarchically distinct abilities assigned to each of the users;
  wherein the users are permitted to view the status of the shopping basket and sequentially affect the state of the shopping basket to collectively select and approve items for purchase.

51. An article of manufacture for conducting commerce in an interactive environment, said article of manufacture comprising:
  a computer usable medium having a computer usable program code embodied therein, said computer usable medium having:
  computer readable program code for providing a website, the website adapted for electronic communication with a plurality of users;
  computer readable program code for providing on the website an electronic shopping basket being selectively actuatable into a plurality of states;
  computer readable program code for enabling the plurality of users to access the shopping basket when the shopping basket is disposed in any of the states; and
  computer readable program code for assigning to each of the users at least one of a plurality of hierarchically distinct abilities to affect the state of the shopping basket;
  wherein the users are permitted to view the status of the shopping basket and sequentially affect the state of the shopping basket to collectively select and approve items for purchase.

52. The method of claim 1, wherein the ability to affect the state of the shopping basket comprises assigning to each of the plurality of users at least one of a plurality of hierarchically distinct levels of authority selectively permitting and preventing alteration of the shopping basket into the plurality of states.

53. The method of claim 52, further comprising the step of permitting users having the same level of authority to each affect the state of the shopping basket.

54. The method of claim 1, wherein the plurality of users may simultaneously access the shopping basket.

55. A computer implemented method in an interactive medium for conducting commerce, said method comprising the steps of:
  a. providing a website, the website adapted for electronic communication with a plurality of users;
  b. providing on the website an electronic shopping receptacle;
  c. enabling at least two of the plurality of users to access the shopping receptacle, the at least two of the plurality of users including a first user and a second user; and
  d. assigning to each of the users at least one of a plurality of unequal abilities to interact with the shopping receptacle, the abilities including enabling the first user to select items for placement into the shopping receptacle, and enabling the second user to purchase the items wherein the items are shipped to the first user.

56. The method of claim 55, wherein said assigning step (d) comprises assigning mutually distinct abilities to each of the plurality of users.

57. The method of claim 55, wherein the abilities further comprise enabling the first user to purchase the items.

58. The method of claim 55, further comprising the step of automatically notifying at least one of the plurality of users when items have been selected for placement into the shopping receptacle.

59. The method of claim 58, further comprising means for said automatically notifying step, selected from the group consisting of: automatically e-mailing the users; automatically affecting a display of the shopping basket on the website; and manually e-mailing the users.

60. The method of claim 55, wherein said assigning step (d) further comprises assigning to a second user a subset of the abilities assigned to a first user.

61. The method of claim 55, wherein the shopping receptacle is selectively actuatable into a plurality of states.

62. The method of claim 61, wherein the plurality of states comprises an item selection state and an item purchase state.

63. The method of claim 62, wherein the plurality of states provide selected levels of access to the users, so that the second user is unable to place the shopping receptacle into the item selection state.

64. The method of claim 55, further comprising the step of re-pricing items in the shopping receptacle when a user views the shopping receptacle.

65. The method of claim 55, further comprising the step of providing a search engine to look up items for selection and placement into the shopping cart.

* * * * *